United States Patent [19]

McCollum et al.

[11] 4,445,183
[45] Apr. 24, 1984

[54] ELECTRICAL SWITCH

[75] Inventors: Patrick E. McCollum, Santa Ana, Calif.; William A. McFall, Palm Harbor, Fla.

[73] Assignee: Rockwell International Corporation, El Segundo, Calif.

[21] Appl. No.: 334,002

[22] Filed: Dec. 23, 1981

[51] Int. Cl.³ .................... G01R 19/00; G01R 21/00
[52] U.S. Cl. .................................. 364/483; 364/492; 361/3; 361/8; 361/13
[58] Field of Search .................. 364/483, 492; 361/3, 361/8, 13, 5

[56] References Cited

U.S. PATENT DOCUMENTS

| | | | |
|---|---|---|---|
| 3,588,605 | 6/1971 | Casson | 361/13 |
| 3,614,464 | 10/1971 | Chumakov | 361/8 |
| 4,068,273 | 1/1978 | Metzler | 361/3 |
| 4,152,634 | 5/1979 | Penrod | 361/13 |
| 4,209,818 | 6/1980 | Zylstra et al. | |
| 4,213,165 | 7/1980 | Zylstra et al. | |
| 4,296,449 | 10/1981 | Eichelberger | 361/3 |
| 4,338,611 | 6/1983 | Haferd | 364/487 |
| 4,338,647 | 7/1982 | Wilson et al. | 364/492 |
| 4,356,525 | 10/1982 | Kornrumpf et al. | 361/13 |
| 4,360,847 | 11/1982 | Bloomer | 361/8 |
| 4,365,302 | 12/1982 | Elms | 364/483 |
| 4,371,947 | 2/1983 | Fujisawa | 364/483 |

FOREIGN PATENT DOCUMENTS 3114213 4/1982 Fed. Rep. of Germany ...... 364/483

Primary Examiner—Charles E. Atkinson
Assistant Examiner—John R. Lastova
Attorney, Agent, or Firm—H. Fredrick Hamann; James F. Kirk

[57] ABSTRACT

An electrical switch or power controller is provided controlling the application of a source voltage to a load under the control of an electrical command signal, resulting in the development of a load current in response to said electrical command signal comprising: a semiconductor switching means having a predetermined non-bounce switching characteristic, being responsive to a semiconductor switching means operating signal for connecting said load to said voltage, an electromechanical switch means having a low voltage drop in a conducting condition, being responsive to an electromechanical switching means operating signal and being connected in parallel with the semiconductor switching means for connecting the load to the source voltage, control means responsive to the command electrical signal for providing the semiconductor switching means operating signal and the electromechanical switching means operating signal, whereby the semiconductor switching means predetermined non-bounce switching characteristics provide a bounce free closure of the conduction path from the source voltage to the load and the electromechanical switching means provide a reduced voltage drop across the conduction path thereby reducing the invention electrical switch power dissipation.

36 Claims, 16 Drawing Figures

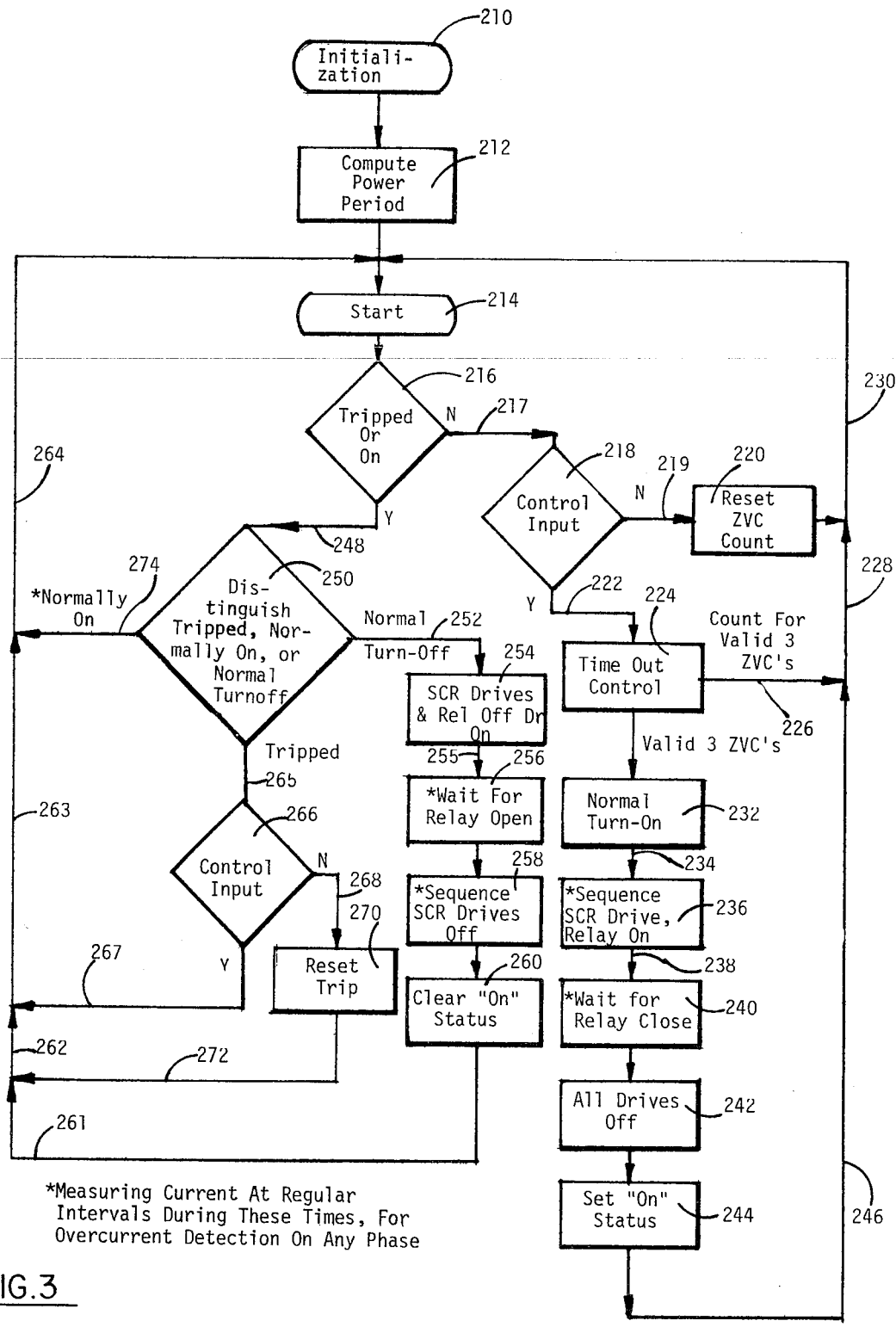
FIG.3    SIMPLIFIED FLOW DIAGRAM

ELECTRICAL SWITCH

The invention herein described was made in the course of or under a contract or subcontract thereunder, with the Department of the Air Force.

BACKGROUND OF THE INVENTION

1. Field of the Invention

This invention relates to the field of electrical switches and particularly to the field of remotely controlled electrical switches capable of interrupting the application of a source voltage to a load in response to an overload condition.

This invention relates more particularly to the field of solid state power controllers or solid state electrical switches such as solid state relays capable of detecting overload conditions and being able to interrupt the electrical service to the load automatically thereby preventing further damage and having the additional capability of being removely resetable after clearing the overload condition. Typical applications for the invention electrical switch include marine and aircraft as well as industrial applications requiring noise free closure and interruption of source power, compact size, extended switch life, low power dissipation and high reliability.

2. Description of the Prior Art

Electromechanical switching devices using solenoid driven means to transfer electromechanical contacts to apply a source voltage to a load, such as relays are well known. When coupled with an electromechanical circuit breaker, a relay provides a remotely controlable power control function. Electromechanical switching devices, such as relays, provide a very low voltage drop at the switch closure thereby afording low power dissipation. As used in a-c power control applications, mechanical contacts cannot conveniently be timed to apply power to the load as the source voltage crosses zero voltage, or to interrupt the application of power as the load current passes through zero so as to minimize transient disturbances. Mechanical wear, electrical arcing and slow response also limit the application of electromechanical devices to applications requiring low closing cycle rates.

The solid state relay is known to overcome the problem of applying a source voltage to a load as the source voltage crosses zero voltage. Solid state relays are also able to interrupt load current as the load current crosses zero. However, solid state relays introduce a substantial voltage drop at the point of circuit closure, thereby providing relatively high power dissipation in comparison to electromechanical switching devices. For this reason solid state relays find their greatest application in controlling electrical service to loads requiring relatively low load currents.

Circuit breakers used to protect the electrical service for a load are typically complex mechanical devices that rely on magnetic circuits or thermally actuated means to detect an overload condition. Environmental effects such as vibration, moisture, temperature and age along with operational effects such as thermal and mechanical fatigue from past overload cycle experiences contribute to the degradation of these assemblies. Contact arcing that is sustained by a high voltage source as the contacts part to protect a circuit experiencing overload conditions, contribute to circuit breaker contact degradation.

The invention electrical switch couples the preferred features of an electromechanical switching means of providing a remotely controllable switch closure having a low voltage drop and the preferred features of a solid state relay of first applying a source voltage to a load as the source voltage crosses zero voltage, and later interrupting the current path as the load current crosses zero with the function of a remotely resetable solid state circuit breaker, absent those features of an electromechanical circuit breaker that contribute to circuit breaker degradation. In addition, the invention electrical switch can be easily fabricated to have load current limitations that far exceed the customary practical limits for solid state relays.

SUMMARY OF THE INVENTION

It is therefore a major objective of this invention to provide an electrical switch having very low voltage drop at the point of switch closure. Another object of this invention is to implement a remotely controllable electrical switch having the ability to independently detect over current conditions and to respond by interrupting the circuit so as to protect the electrical service to the load.

It is a more particular objective of this invention to provide an electrical switch that is remotely resetable after detecting and independently interrupting electrical service to a load due to an overload condition.

Another more particular objective of this invention is to limit contact arcing and contact bounce as the invention electrical switch applies or interrupts electrical service to a load in response to a remote command or independently interrupts the service in response to an overload condition.

Yet another objective of this invention is to provide an electrical switch having the desireable noise free features of a solid state relay without having the customary practical load current limitations imposed by the switch power dissipation of solid state relays.

These and other objectives of the invention are realized in an electrical switch for controlling the application of a source voltage to a load under the control of a command electrical signal, resulting in the development of a load current in response to the command electrical signal comprising: a semiconductor switching means having a predetermined non-bounce switching characteristic, being responsive to a semiconductor switching means operating signal for connecting the load to the source voltage, an electromechanical switching means having a low voltage drop in a conducting condition being responsive to an electromechanical switching means operating signal and being connected in parallel with the semiconductor switching means for connecting the load to the source voltage, control means responsive to the command electrical signal for providing the semiconductor switching means operating signal and the electromechanical switching means operating signal, whereby the semiconductor switching means predetermined non-bounce switching characteristics provide a bounce free closure of the conduction path from the source voltage to the load and the electromechanical switching means provide a reduced voltage drop across the conduction path thereby reducing the invention electrical switch power dissipation.

In a more particular embodiment wherein the source voltage is an alternating source voltage, and the electrical switch further includes: power supply means coupled to the source voltage for developing a control X signal in response to the source voltage passing a predetermined reference potential; the control means being responsive to the control X signal for providing the operating signals corresponding to the control X signal to the semiconductor switching means and the electromechanical switching means; the electromechanical switching means and the semiconductor switching means being responsive to the operating signals to provide a conduction path from the alternating source voltage to the load in synchronization with the control X signal. In another more particular embodiment, the power supply means for developing a control X signal further includes; means responsive to the alternating source voltage crossing zero voltage for adapting the control X signal to correspond with the alternating source voltage crossing zero voltage. In still another more particular embodiment the power supply means for developing the control X signal further includes: means responsive to the alternating source voltage crossing zero voltage for adapting the control X signal to correspond with the alternating source voltage crossing zero voltage having a first predetermined sequence of polarity change, the control means being responsive to the control X signal to synchronize the operating signals to obtain bounce free closure of the conduction path from the alternating source voltage to the load corresponding with the alternating source voltage crossing zero voltage having a first predetermined sequence of source voltage polarity change.

In another more particular embodiment the control means is responsive to the concurrence of the electrical command signal and an predetermined control X signal to provide the semiconductor switching means operating signal and the electromechanical switching means operating signal, the semiconductor switching means being responsive to the semiconductor switching means operating signal to provide a first conduction path from the alternating source voltage to the load corresponding with a first predetermined sequence of alternating source voltage polarity change and the electromechanical switching means being responsive to the electromechanical switching means operating signal to provide a second conduction path having a low voltage drop in shunt with the first conduction path.

In another even more particular embodiment, the electromechanical switching means further includes:

a. load contacts wired to connect the alternating source voltage to the load in response to operation of the electromechanical switching means, and b. position contacts operating to provide a load contact closed position signal, CP, corresponding to closure of the load contacts.

The control means further includes means responsive to the contact closed position signal signaling load contact closure for synchronizing the termination of the semiconductor switching means operating signal with closure of the load contacts, the semiconductor switching means becoming non-conductive in response to termination of the operating signal thereby interrupting the first conduction path subsequent to load contact closure whereby the load contacts provide a low voltage drop and interruption of the first operating signal provides a reduction in the power required to activate the semiconductor switching means.

In another more particular embodiment the control means is responsive to interruption of the electrical command signal to provide the semiconductor switching means operating signal and to interrupt the electromechanical switching means operating signal, the semiconductor switching means being responsive to the semiconductor switching means operating signal, provides a first conduction path from the alternating source voltage to the load in parallel with the load contacts before the electromechanical switching means load contacts open in response to interruption of the electromechanical switching means operating signal. The control means is further adapted to interrupt the semiconductor switching means operating signal subsequent to the load contact opening, the interruption of the semiconductor switching means operating signal occuring before the source voltage crosses zero voltage having a first predetermined sequence of polarity change, the semiconductor switching means being responsive to interruption of the semiconductor switching means operating signal to interrupt the first conduction path in synchronization with the alternating source voltage crossing zero voltage having a first predetermined sequence of polarity change, whereby the invention electrical switch interrupts the conductive path to the load without contact bounce, associated arcing and in a manner minimizing the dc component of source voltage applied to the load.

In another even more particular embodiment, the electrical switch further comprises: load current sensing means interposed in series with the load current conduction path for providing a current amplitude signal, the control means being responsive to the current amplitude signal for comparing the current amplitude signal with a first predetermined current amplitude threshold limit. The control means is responsive to the current amplitude signal exceeding the first predetermined current amplitude threshold limit for providing a fast trip signal, the control means being responsive to the fast trip signal to interrupt the operating signals for the semiconductor switching means and the electromechanical switching means, whereby the semiconductor switching means and the electromechanical switching means interrupt the load current path to the load. In yet another embodiment the load current sensing means further comprises: means for converting the current amplitude signal into a digital current amplitude signal, the control means being responsive to the digital current amplitude signal, for comparing the digital current amplitude signal with a first predetermined digital current amplitude threshold limit, the control means being responsive to the digital current amplitude signal exceeding the first predetermined digital current amplitude threshold limit for providing the fast trip signal.

In yet another more particular embodiment the control means further includes: a first accumulator, means for sampling the digital current amplitude signal, squaring each sampled digital current amplitude signal, adding each squared digital current amplitude signal to the accumulator, subtracting a first predetermined constant from the accumulator after each addition of the sampled squared digital current amplitude signal, comparing the accumulator value with a second predetermined constant, providing a normal trip signal in response to the accumulator value exceeding the second predetermined constant, the control means being responsive to the normal trip signal to interrupt the operating signals for the semiconductor switching means and the electromechanical switching means, whereby the semiconductor switching means and the electromechanical switching means interrupt the load current conduction path to the load.

In another alternative and even more particular embodiment the electrical switch further comprises: load current sensing means interposed in series with the load current conduction path for providing a squared current amplitude signal proportional to the square of the load current, the control means being responsive to the squared current amplitude signal and is further adapted to compare the squared current amplitude signal with a first predetermined current amplitude threshold limit. The control means is responsive to the squared current amplitude signal exceeding the first predetermined current amplitude threshold limit for providing a fast trip signal. The control means is responsive to the fast trip signal to interrupt the operating signals for the semiconductor switching means and the electromechanical switching means, whereby the semiconductor switching means and the electromechanical switching means interrupt the load current path to the load. In yet another even more particular alternative embodiment, the load current sensing means further comprises: means for converting the squared current amplitude signal into a squared digital current amplitude signal, the control means being responsive to the squared digital current amplitude signal for comparing the squared digital current amplitude signal with a first predetermined squared digital current amplitude threshold limit, the control means being responsive to the squared digital current amplitude signal exceeding the first predetermined squared digital current amplitude threshold for providing the fast trip signal.

Another more particular alternative embodiment includes a first accumulator, means for sampling the squared digital current amplitude signal, adding each squared digital current amplitude signal to the accumulator, subtracting a first predetermined constant from the accumulator after each addition of the sampled squared digital current amplitude signal, comparing the accumulator value with a second predetermined constant, providing a normal trip signal in response to the accumulator value exceeding the second predetermined constant. The control means is responsive to the normal trip signal to interrupt the operating signals for the semiconductor switching means and the electromechanical switching means, whereby the semiconductor switching means and the electromechanical switching means interrupt the load current conduction path to the load.

In another more particular embodiment, the control means further includes means responsive to the concurrence of the electrical command signal and a fast trip signal or normal trip signal, to provide the semiconductor switching means operating signal to establish a conductive first conduction path from the alternating source voltage to the load. The conducting first conduction path acts to share current with the load contact. The control means is further adapted to interrupt the operating signal to the electromechanical switching means. The control means further includes means responsive to loss of the contact closed position signal signaling opening of the load contact for interrupting the semiconductor switching means operating signal, whereby the conducting first conduction path becomes non-conductive, thereby preventing failure.

In another alternative and more particular embodiment the semiconductor switching means is further comprised of anti-parallel silicon controlled rectifiers.

In another alternative embodiment the semiconductor switching means is further comprised of a TRIAC.

In yet another more particular alternative embodiment the semiconductor switching means is further comprised of diode blocked anti-parallel transistors.

In another most particular alternative embodiment the electromechanical switching means further comprises a relay having a position contact, a load contact and a current sharing resistor, the load contact and current sharing resistor being connected in series with the load contact whereby load current sharing is obtained between the load contact and the semiconductor switching means.

In a more particular embodiment the relay is a latching relay, a latching relay having a set coil and a reset coil, the control means being further adapted to provide a set pulse to the set coil to transfer the latching relay to close the load contact in response to the electromechanical switching means operating signal and to provide a reset pulse to the reset coil to transfer the relay to open the load contact in response to interruption of the electromechanical switching means operating signal.

In another alternative embodiment, the control means further includes a microcomputer having a predetermined program, the microcomputer being adapted to receive the electrical command signal, the load contact closed position signal and the squared digital current amplitude signal, the predetermined program being further adapted to provide the fast trip signal, the normal trip signal, the semiconductor switching means operating signal and the electromechanical switching means operating signal, whereby the microcomputer controls closing and interrupting the first and second conduction paths from the alternating source voltage to the load in response to the electrical command signal, the load contact closed position signal and the squared digital current amplitude signal.

In another alternative embodiment, the anti-parallel silicon controlled rectifiers are responsive to the SCR drive signals, and wherein said control means further includes a control and drive electronic circuit means, said control and drive electronic circuit means being responsive to the semiconductor switching means operating signal for providing the SCR drive signal to the anti-parallel silicon controlled rectifiers. The control and drive electronic circuit means being further adapted to be responsive to the control means electromechanical switching means operating signal to provide an electrical set pulse to the set coil to transfer the latching relay to close the load contacts in response to the electromechanical switching means operating signal and to provide an electrical reset pulse to the reset coil to transfer the latching relay to open the load contacts in response to interruption of the electromechanical switching means operating signal.

In a more particular embodiment, the microcomputer predetermined program is adapted to follow the flowchart shown in FIG. 3.

Another alternative embodiment of the invention electrical switch provides a multiple phase electrical switch for controlling the application of a multiple phase alternating source voltage to a load under the control of an electrical command signal resulting in the development of a load current in each source voltage phase in response to the electrical command signal comprising: a plurality of phase related semiconductor switching means, having a predetermined non-bounce switching characteristic, each phase related semiconductor switching means being connected in series with a respective alternating source voltage phase, and each being responsive to a respective phase related semiconductor switching means operating signal to form respective phase related semiconductor conduction paths from each respective alternating source voltage phase to the load. The invention multiple phase electrical switch also comprises an electromechanical switching means having a plurality of phase related load contacts, each respective phase related load contact operating in parallel with a respective phase related semiconductor switching means, the electromechanical switching means being responsive to an electromechanical switching means operating signal to close the plurality of phase related load contacts. Each respective phase related load contact operates in parallel with a respective phase related semiconductor switching means to form a phase related parallel conduction path for connecting each respective alternating source voltage phase to the load, control means responsive to the electrical command signal for providing the respective phase related semiconductor switching means operating signal and the electromechanical switching means operating signal. The plurality of phase related semiconductor switching means having predetermined non-bounce switching characteristics provide a bounce free closure of each respective phase related semiconductor conduction path from each respective alternating source voltage phase to the load and the electromechanical switching means plurality of phase related load contacts provide respective phase related parallel conduction paths for connecting each respective alternating source voltage phase to the load, the phase related load contacts providing a reduced voltage drop thereby reducing the invention multiple phase electrical switch power dissipation.

A more particular preferred embodiment further includes power supply means coupled to a first phase of the multiple phase alternating source voltage and being adapted to provide a phase related first zero crossing signal corresponding to the first phase alternating source phase voltage crossing zero voltage having a first predetermined sequence of polarity change, the electromechanical switching means further including a load contact position signal contact, the load contact position signal contact closing in synchronization with the plurality of phase related load contacts and providing a load contact position signal. The control means in response to the electrical command signal and in response to the phase related first zero crossing signal being further adapted to synchronize respective phase related semiconductor switching means operating signals to each respective phase related semiconductor switching means in synchronized source phase voltage crossing zero voltage with a first predetermined sequence of polarity change relation, the control means being further adapted to concurrently provide the electromechanical switching means operating signal. The control means is further adapted to be responsive to interruption of the electrical command signal to synchronize activation of the phase related semiconductor switching means operating signals with interruption of the electromechanical switching means operating signal and to synchronize interruption of each respective phase related semiconductor switching means operating signals with the first phase alternating source phase voltage crossing zero voltage with a first predetermined sequence of polarity change and with loss of the load contact position signal interrupting the respective phase related semiconductor conduction paths subsequent to opening of the load contacts. In response to the electrical command signal, the plurality of phase related semiconductor switching means provide a bounce free closure of the phase related conduction paths in synchronization with a first phase alternating source phase voltage crossing zero voltage with a first predetermined sequence of polarity change. In response to removal of the electrical command signal, the plurality of phase related semiconductor switching means provide a noise free interruption of the phase related conduction paths subsequent to opening of the load contacts signalled by interruption of the load contact position signal, and in synchronization with the first phase alternating source phase voltage crossing zero voltage with a first predetermined sequence of polarity change.

In another alternative embodiment, the control means in response to the electrical command signal is further adapted to synchronize termination of the respective phase related semiconductor switching means operating signals with closure of the load contact position signal contact, whereby the respective phase related semiconductor switching means interrupts the respective phase related semiconductor conduction path from each respective alternating source voltage phase to the load subsequent to closure of the load contacts, thereby conserving power required to activate the phase related semiconductor switching means.

In another more particular embodiment, a plurality of phase related current sharing resistors are included, each respective phase related current sharing resistor being connected in series with a respective phase related load contact, the respective series connected phase related load current sharing resistor and phase related load contact operating in parallel with a respective phase related semiconductor switching means forming phase related parallel conduction paths for connecting each respective alternating source voltage phase to the load whereby each respective phase related current sharing resistor operates to provide load current sharing between the respective phase related load contact and the phase related semiconductor switching means.

In yet another more particular embodiment, the multiple phase electrical switch further comprises: a plurality of phase related load current sensing means, each respective phase related load current sensing means being interposed in series with a respective multiple phase alternating source voltage phase load current conduction path for providing a respective phase related current amplitude signal. The control means is further adapted to be responsive to the phase related current amplitude signals for comparing the current amplitude signals with a first predetermined current amplitude threshold limit. The control means is also further adapted to be responsive to the phase related current amplitude signals exceeding the first predetermined current amplitude threshold limit for providing a fast trip signal, the control means being responsive to the fast trip signal to interrupt the phase related semiconductor switching means operating signals and the electromechanical switching means operating signals, whereby the phase related semiconductor switching means and the electromechanical switching means phase related load contacts interrupt the load current path to the load.

In yet another more particular embodiment, the phase related load current sensing means further comprises: means for converting the phase related current amplitude signals into phase related digital current amplitude signals, the control means being responsive to the phase related digital current amplitude signals for comparing the phase related digital current amplitude signals with a first predetermined digital current amplitude threshold limit, the control means being responsive to any phase related digital current amplitude signal exceeding a first predetermined digital current amplitude threshold limit for providing the fast trip signal.

In another alternative embodiment the control means includes, accumulator means having an accumulator, means for sampling the phase related digital current amplitude signals, squaring each sampled phase related digital current amplitude signal, adding each respective squared phase related digital current amplitude signal to the accumulator, subtracting a predetermined constant from the accumulator after each addition of the sampled squared phase related digital current amplitude signal, comparing each accumulator value with a second predetermined constant threshold limit, providing a normal trip signal in response to the accumulator value exceeding the second predetermined constant threshold limit, the control means being responsive to the normal trip signal to interrupt the phase related semiconductor switching means operating signals and and the electromechanical switching means operating signal, whereby the respective phase related semiconductor switching means and the electromechanical switching means load contacts interrupt the phase related load current conduction paths to the load.

In still another alternative embodiment the accumulator means further includes, a plurality of phase related accumulators, the control means further including, means for sampling the phase related digital current amplitude signals, squaring each sampled phase related digital current amplitude signal, adding each respective squared phase related digital current amplitude signal to a respective phase related accumulator, subtracting a predetermined constant from each respective phase related accumulator after each addition of the sampled squared phase related digital current amplitude signal, comparing each respective phase related accumulator value with a second predetermined constant threshold limit, providing a normal trip signal in response to the accumulator value exceeding the second predetermined constant threshold limit, whereby the respective phase related semiconductor switching means and the electromechanical switching means load contacts interrupt the respective phase related load current conduction paths to the load.

In a more particular embodiment, the phase related load current sensing means is further adapted to provide respective squared phase related current amplitude signals, the control means being further adapted to be responsive to the squared phase related current amplitude signals for comparing the squared amplitude signals with a first predetermined squared current amplitude threshold limit, the control means being further adapted to be responsive to the squared phase related current amplitude signals exceeding the first predetermined squared current amplitude threshold limit for providing the fast trip signal, whereby the phase related semiconductor switching means and the electromechanical switching means phase related load contacts interrupt the load current path to the load.

In another alternative embodiment the phase related load current sensing means further comprises: means for converting the squared phase related load current amplitude signals into squared phase related digital current amplitude signals, the control means being responsive to the squared phase related digital current amplitude signals for comparing the squared phase related digital current amplitude signals with a first squared predetermined digital current amplitude threshold limit, the control means being responsive to any squared phase related digital current amplitude signal exceeding the first predetermined squared digital current amplitude threshold limit for providing the fast trip signal. In a more particular embodiment, the control means further includes squared accumulator means having means for sampling the squared phase related digital current amplitude signals, adding each respective squared phase related digital current amplitude signal to the squared accumulator, subtracting a predetermined constant from each squared accumulator after each addition of the sampled squared phase related digital current amplitude signal, comparing each squared accumulator value with a second predetermined constant threshold limit, providing a normal trip signal in response to the squared accumulator value exceeding the second predetermined constant threshold limit, the control means being responsive to the normal trip signal to interrupt the phase related semiconductor switching means operating signals and the electromechanical switching means operating signal, whereby the respective phase related semiconductor switching means and the electromechanical switching means phase related load contacts interrupt the phase related load current conduction paths to the load.

In another more particular embodiment, the control means further includes, accumulator means having a plurality of squared phase related accumulators, means for sampling the squared phase related digital current amplitude signals, adding each respective squared phase related digital current amplitude signal to the respective squared phase related accumulator, subtracting a predetermined constant from each respective squared phase related accumulator after each addition of the sampled squared phase related digital current amplitude signal, comparing each respective squared phase related accumulator value with a second predetermined constant threshold limit, providing a normal trip signal in response to the accumulator value exceeding the second predetermined constant threshold limit, the control means being responsive to the normal trip signal to interrupt the phase related semiconductor switching means operating signals and the electromechanical switching means operating signal whereby the respective phase related semiconductor switching means and the electromechanical switching means phase related load contacts interrupt the phase related load current conduction paths to the load. In another even more particular alternative embodiment the control means further includes; a microcomputer having a predetermined program, the microcomputer being adapted to receive the electrical command signal, the load contact closed position signal, the phase related first zero crossing signal, and the squared phase related digital current amplitude signals. The predetermined program is further adapted to provide the plurality of squared phase related accumulators, the fast trip signal, the normal trip signal, the semiconductor switching means operating signal and the electromechanical switching means operating signal, whereby the microcomputer controls closing and interrupting the respective phase related semiconductor switching means and the electromechanical phase related load contacts.

In alternative embodiment, the control means further includes; a microcomputer having a predetermined program, the microcomputer being adapted to receive the electrical command signal, the load current closed position signal, the phase related first zero crossing signal and the phase related digital current amplitude signals. The predetermined program is further adapted to provide the plurality of phase related accumulators, the fast trip signal, the normal trip signal, the semiconductor switching means operating signals, and the electromechanical switching means operating signal, whereby the microcomputer controls closing and interrupting the respective phase related semiconductor switching means and the electromechanical switching means phase related load contacts.

In another more particular embodiment the predetermined program provides a plurality of phase related interrupt timing signals referenced to the first zero crossing signal, the predetermined program being responsive to interruption of the electrical command signal, interruption of the contact position signal, and the respective phase related interrupt timing signal to synchronize interruption of the semiconductor switching means operating signal in sequential, respective, source voltage crossing zero voltage having a first predetermined sequence of polarity change relation.

In another most particular preferred embodiment, the respective phase related interrupt timing signals are synchronized to occur approximately three quarters cycle after each respective source voltage phase crosses zero voltage having a first predetermined sequence of polarity change.

BRIEF DESCRIPTION OF THE DRAWINGS

The invention will be further described as to an illustrative embodiment in conjunction with the accompanying drawings in which:

FIG. 1b depicts the voltage waveform across the load resulting from an electrical control signal for the prior art circuit of FIG. 1a.

FIG. 3 is a simplified electrical switch flow diagram.

DESCRIPTION OF THE PREFERRED EMBODIMENT

Figure 1A:
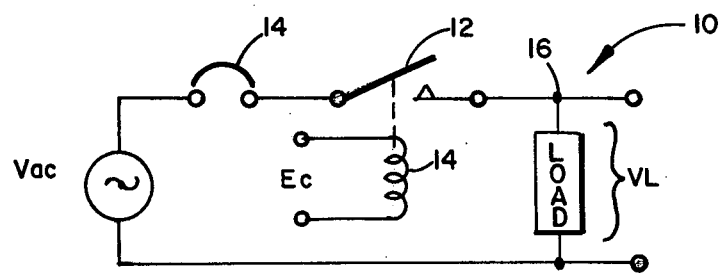
FIG. 1a is a schematic of a prior art electromechanical remotely controlled electrical switch.

Referring now to FIG. 1a, there is shown a schematic of a prior art relay 10 applying an alternating source voltage Vac through a load contact 12 to a load, the voltage being designated by VL. The relay coil 14 is operated by electrical command signal Ec. This method of controlling the application of an alternating source voltage to a load has the following disadvantages: the rate of rise of voltage on connection 16 is uncontrollably high at the instant contact 12 closes, the time between the application of electrical command signal Ec to coil 14 and the closure of load contact 12 is relatively long and, to some extent non-uniform. In addition load contact 12 is subject to wear as a result of arcing and mechanical wiping as load contact 12 opens and closes. When an overcurrent condition is detected by the thermal circuit breaker 14, it actuates to an open position, interrupting the application of power by source Vac to the load VL, thus creating a "tripped" condition.

Figure 1B:
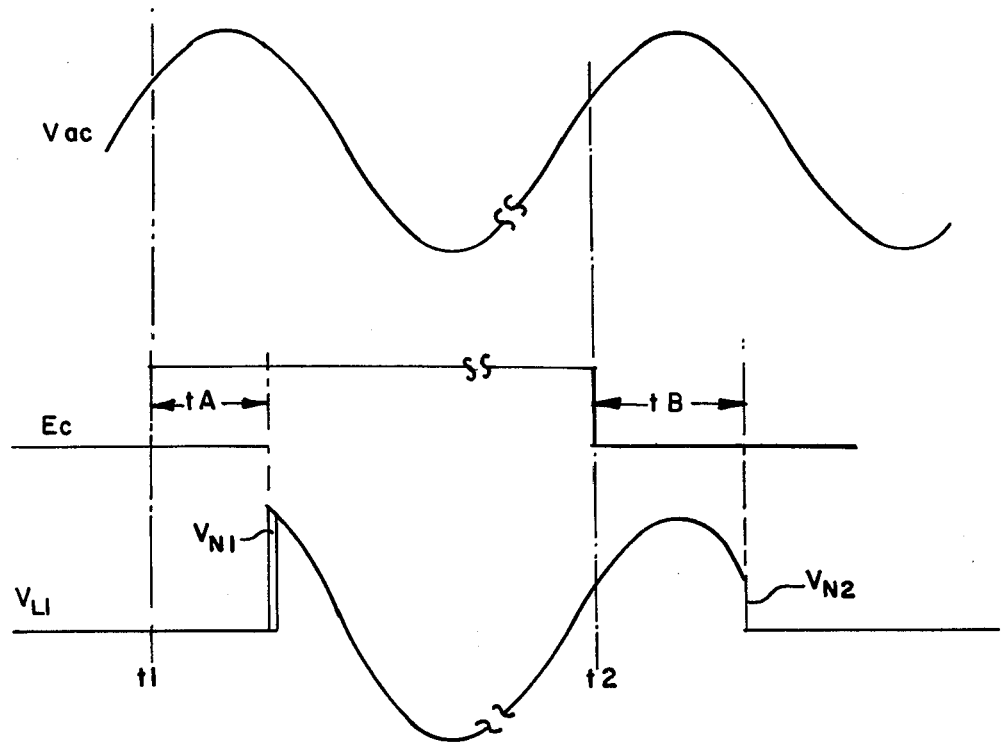

FIG. 1b shows the applied alternating source voltage Vac in relation to the electrical command signal Ec applied to the relay coil at an arbitrary point in time t1. The time required for the relay to transfer the load contact is shown as tA. As load contact 12 closes the voltage across the load V1 is shown rising abruptly as Vn1. The abrupt rise in voltage is accompanied by undesirable noise due to contact bounce. Electrical command signal Ec is shown ending asynchronously at time t2. Load contacts open after interval tB providing an abrupt drop in voltage Vn2. Voltage noise is present on circuit connection 16 at Vn2 due to contact bounce and arcing.

Figure 2A:
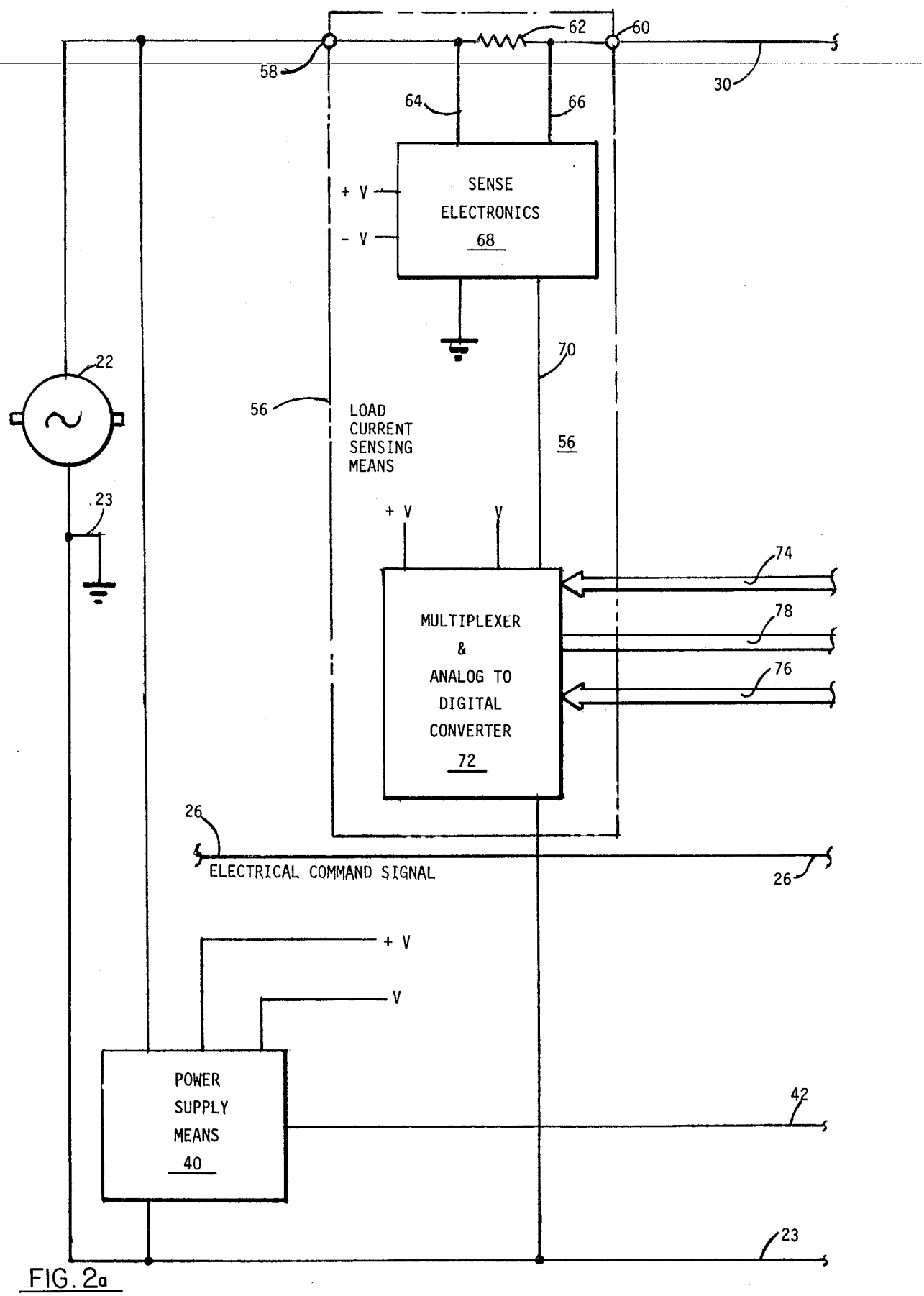
FIG. 2a–2b is a block diagram of a single phase electrical switch.
Figure 2B:
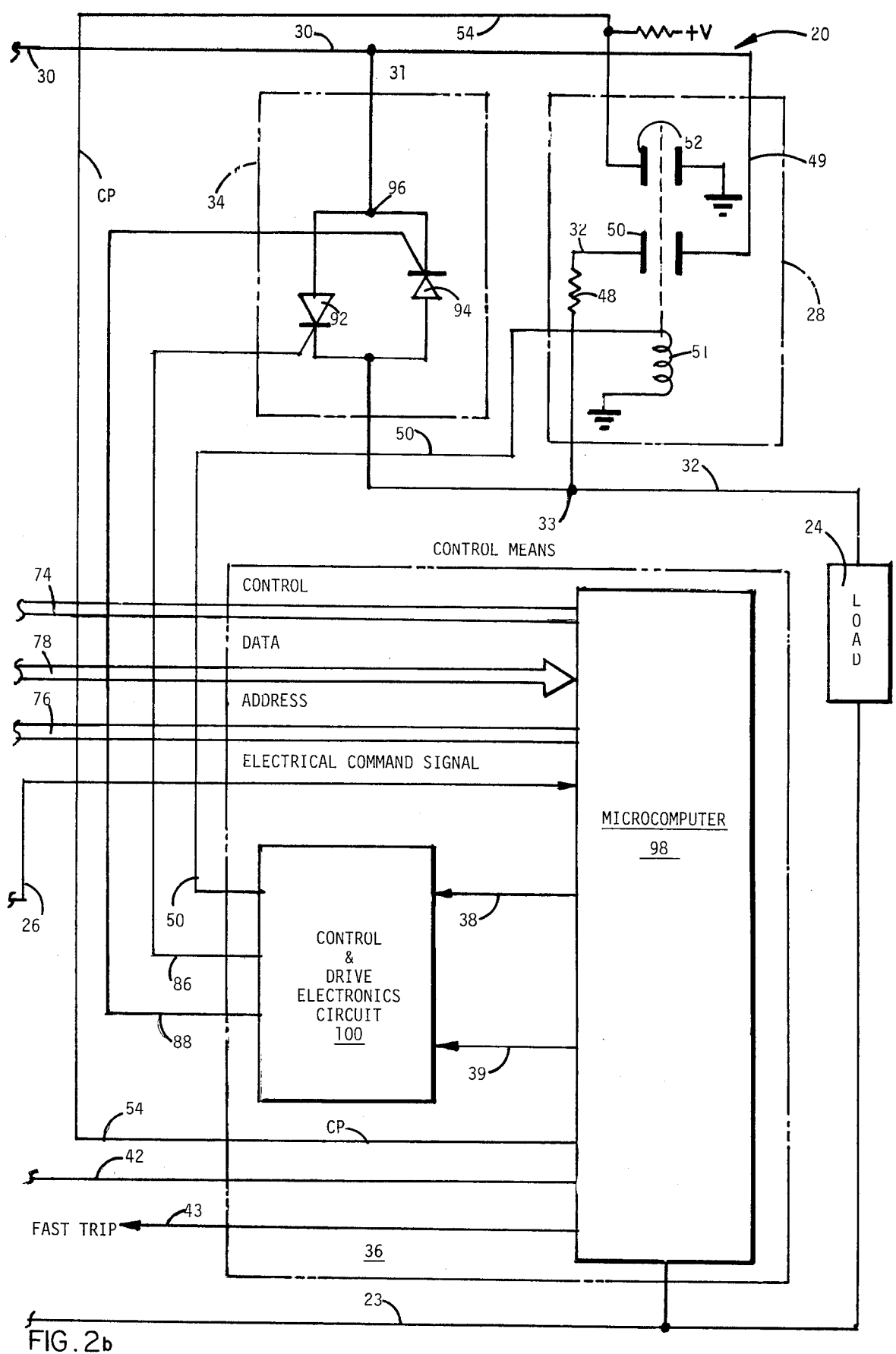

FIGS. 2a and 2b depict the block diagram of a single phase electrical switch 20 for controlling the application of a source voltage 22 to a load 24 under the control of an ELECTRICAL COMMAND signal carried on line 26. The electromechanical switch means 28, having a low voltage drop when in a conducting condition, connects the load 24 to the source voltage 22 through conductors 30 and 32, respectively. Semiconductor switch means 34 having a predetermined non-bounce switching characteristic is connected in parallel with the electromechanical switch means 28 and provides a parallel conduction path for load current.

The control means 36 is responsive to the ELECTRICAL COMMAND SIGNAL for providing operating signals carried on lines 38 and 39, to control the electromechanical switch means 28 and the semiconductor switch means 34. The semiconductor switch means predetermined non-bounce switching characteristics provide a bounce free closure of the conduction path from the source voltage 22 through conductors 30 and 32 to the load 24, and the electromechanical switch means 28 provides a reduced voltage drop across the conduction path formed by the electromechanical switching means 28 operating in parallel with the semiconductor switching means 34 and operating between conductors 30 and 32.

In the preferred embodiment of FIGS. 2a and 2b, the source voltage 22 is alternating and further includes power supply means 40 coupled to the source voltage 22 for developing the CONTROL X signal carried on line 42 in response to the source voltage passing a predetermined reference potential. In the preferred embodiment, the power supply means 40 for developing CONTROL X further includes means responsive to the alternating source voltage 22 crossing zero voltage measured with respect to ground 23 for adapting the CONTROL X signal to correspond with the alternating source voltage 22 crossing zero voltage. More particularly the power supply means 40 for developing CONTROL X further includes means responsive to the alternating source voltage crossing zero voltage for adapting CONTROL X to correspond with the alternating source voltage crossing zero voltage having a first predetermined sequence of source voltage polarity change. As an example, a first sequence of polarity change includes a plus to minus change.

Normal Turn-On Sequence, Single Phase Switch

A predetermined delay interval follows the occurrence of a valid ELECTRICAL COMMAND SIGNAL on line 26. The Control means being responsive to a CONTROL X signal on line 42 provides corresponding first and second operating signals on lines 38 and 39 for the control of the semiconductor switch means 34 and the electromechanical switch means 28.

The semiconductor switching means, depicted as silicon controlled rectifiers (SCRs) 92, 94 are provided with gate drive signals on lines 86, 88. These SCRs become conductive in response to the operating signal on line 38, thereby providing the first bounce-free conduction path from terminal 31 to 96, to terminal 33.

The electromechanical switch means 28 is a relay including load contact 50 wired to connect the alternating source voltage 22 from terminal 31 through a second conductive path 49 to the load 24 in response to operation of said electromechanical switch means, and position contact 52 providing a ground 23 signal CP to control means 36, corresponding to closure of load contact 50.

The semiconductor switch means being responsive to the operating signal on line 38 becomes conductive in synchronization with the CONTROL X signal. The electromechanical switch means, being slower to react, subsequently responds to the second operating signal on line 39. Closure of the electromechanical switch means 38 in parallel with the semiconductor switch means 34 provides a parallel, bounce free, low voltage drop conduction path from the alternating source voltage 22 to terminal 31, to terminal 33 and to load 24 corresponding (i.e. in synchronization) with the CONTROL X signal carried on line 42. The control means is further adapted to interrupt the semiconductor switch means operating signal on line 38 subsequent to closure of the electromechanical switching means conduction path from terminal 31 to 96 to 33.

Normal Turn-Off Sequence, Single Phase Switch

A normal turn-off sequence begins with interruption of the ELECTRICAL COMMAND SIGNAL on line 26. Following the interruption, the control means 36 provides a delay by counting a predetermined number of CONTROL X signals to validate the interruption of the ELECTRICAL COMMAND SIGNAL. Following the required delay, typically equivalent to three sequential CONTROL X SIGNALS, the control means 36 interrupts the electromechanical switching means operating signal depicted as the second operating signal on line 39.

Concurrent with interruption of the electromechanical switching means operating signal, the control means activates the semiconductor switching means operating signal, on line 38 to turn-on the SCRs 92, 94 via control CONTROL AND DRIVE ELECTRONICS block 100. The semiconductor switch means turns on before load contact 50 parts, due to delay typically associated with resetting an electromechanical switch means typically comprised of a relay.

The control means is further adapted to interrupt the semiconductor switching means operating signal on line 38 in response to the contact closed position contact 52 signaling opening of the load contact 50 by opening the ground on the CP signal line 54 and provides a +V, or logic zero signal to microcomputer 98. Interruption of the semiconductor switch means operating signal 38, which in turn interrupts the gate drive signals on lines 86 and 88, is further synchronized to occur approximately ¾ cycle after the source voltage crosses zero voltage having a first predetermined sequence of source voltage polarity change, i.e., a plus to minus change.

Providing the above referenced delay to an embodiment using SCRs for the semiconductor switch means 34 insures that sufficient current will be passing through the SCRs, as the gate drives are interrupted, to insure continued latching when driving highly inductive loads throughout the half cycle following the source voltage crossing zero voltage having a first predetermined sequence of polarity change.

The SCRs turn-off as the load current through them passes through zero. This property of SCRs or TRIACs, eliminates undesireable arcing that typically is associated with loads comprised of magnetic components such as transformers and solenoids. Arcing contributes to relay contact wear. This invention will contribute to extended relay life because the semiconductor switching means 34 effectively clamps the voltage across the opening relay load contact 50 to less than a few volts as they part. By requiring that the conductive path be initially completed by the semiconductor switch means 34 turning-on concurrently with the source voltage crossing zero having a first predetermined sequence of polarity change, and by also requiring that the conductive path be finally interrupted by the semiconductor switch means turning-off after the source voltage crosses zero having a first predetermined sequence of polarity change, the invention reduces the dc component of source voltage applied to the load.

The electrical switch further comprises load current sensing means 56 interposed between terminals 58 and 60 in series with the load current conduction path between alternating source voltage 22 and load 24, for providing a current amplitude signal. The control means 36 is responsive to the current amplitude signal and compares the current amplitude signal with a first predetermined current amplitude threshold limit. The control means responds to the current amplitude signal exceeding the first predetermined current amplitude threshold limit and provides a fast trip signal. The control means is responsive to the fast trip signal to interrupt said operating signals 38, 39 for the semiconductor switch means 34 and the electromechanical switch means 28. The semiconductor switch means and the electromechanical switch means interrupt the load current path to the load.

In the preferred embodiment, the load current sensing means 56 further comprises means for converting the current amplitude signal into a digital current amplitude signal; the control means 36 being adapted to compare the digital current amplitude signal with a first predetermined digital current amplitude threshold limit, and to provide a fast trip signal when the digital current amplitude signal exceeds the first predetermined digital current amplitude threshold.

Sense resistor 62 connects terminals 58 and 60. The load current passes through sense resistor 62 and provides a voltage proportional to load current on lines 64 and 66 to the SENSE ELECTRONICS 68. The sense resistor 62 selected makes use of conductor used in the circuit as a resistance element for current sensing. The material selected for the conductor is manganin, a copper alloy that is chosen for its very low temperature coefficient of resistivity.

The SENSE ELECTRONICS 68 provides a signal on line 70 proportional to the square of the load current sense signal to the MULTIPLEXER AND ANALOG TO DIGITAL CONVERTER 72. The multiplexer feature of block 72 is necessary in multiple phase systems for connecting the analog to digital converter to signal lines, such as line 70. The multiplexer is addressed by a digital address provided on address bus 76 from control means 36. The multiplexer feature and address bus 76 are not essential to the operation of a single phase switch. The analog-to-digital converter feature of block 72 converts the signal voltage on line 70 to a digital signal and provides this digital signal to control means 36 on data bus 78 as instructed by digital commands received on control bus 74.

The control means also includes a first accumulator, not shown on FIG. 2, and means for sampling the digital current amplitude signal, adding each squared digital current amplitude signal to the accumulator, subtracting a first predetermined constant from the accumulator after each addition of the sampled squared digital current amplitude signal, comparing the accumulator value with a second predetermined constant and providing a normal trip signal in response to the accumulator value exceeding the second predetermined constant. The control means responds to a normal trip signal by interrupting the operating signals for the semiconductor switch means and the electromechanical switch means.

The control means further includes MICROCOMPUTER 98 having an accumulator. In an alternative embodiment, MICROCOMPUTER 98 is provided with a program which provides instruction sequences for sampling the digital current amplitude signal on DATA BUS 78, squaring each of the sample digital amplitude signals, adding each of the squared digital amplitude signals to the accumulator, subtracting a predetermined constant from the accumulator after each addition of the sampled squared digital current amplitude signal, comparing the accumulator value with a second predetermined constant, providing a normal trip signal in response to the accumulator value exceeding a second predetermined constant, the control means being responsive to the normal trip signal to interrupt the operating signals 38, 39 for the semiconductor switch means 34 and the electromechanical switch means 28, whereby the semiconductor switch means 34 and the electromechanical switch means 28 open interrupting the load current conduction path 30 to the load 24.

In the preferred embodiment, the load current sensing means 56 provides a squared current amplitude signal proportional to the square of the load current passing through resistor 62. The control means 36 is adapted to compare the squared current amplitude signal with a first predetermined current amplitude threshold limit, and to respond to the squared current amplitude signal exceeding the first predetermined threshold limit by providing a fast trip signal. The control means responds to the fast trip signal by interrupting the operating signals for the semiconductor and electromechanical switch means 34, 28 to interrupt the load current to load 24.

In the preferred embodiment, the load current sensing means 56 further includes means for converting the squared current amplitude signal into a squared digital current amplitude signal. The control means 36 is responsive to the squared current amplitude signal on data bus 78 and compares this current amplitude signal with a first predetermined current amplitude threshold limit, for example, a limit equal to ten times the maximum current rating of the switch. The control means responds to the current amplitude signal exceeding the first predetermined current amplitude threshold limit by providing a fast trip signal to interrupt the operating signals on lines 38 and 39 for the semiconductor switch means and the electromechanical switch means whereby the semiconductor switch means 34 and the electromechanical switch means 28 interrupt the load current path to the load. An external fast trip signal in provided on line 43 for indicator purposes.

To provide a normal trip signal in a preferred embodiment having a current sensing means 56 that provides a squared digital current amplitude signal, the control means would further include: a first accumulator, means for sampling the squared digital current amplitude signal, adding each squared digital current amplitude signal to the accumulator, subtracting a first predetermined constant from the accumulator after each addition of the sampled squared digital current amplitude signal, comparing the accumulator value with a second predetermined constant, providing a normal trip signal in response to the accumulator value exceeding the second predetermined constant. The control means responds to a normal trip signal by interrupting the operating signals for the semiconductor switching means and said electromechanical switching means; whereby the semiconductor switching means and the electromechanical switching means interrupt the load current conduction path to said load.

In alternative embodiments having either squaring or non-squaring current sense means 56, the control means more particularly includes means responsive to the concurrence of the electrical command signal 26 and a fast trip signal or a normal trip signal, to interrupt the electromechanical switch means operating signal and to simultaneously provide a semiconductor switch means operating signal so as to establish a conductive first conduction path 31, 96, 33 from the alternating source voltage to the load. The conducting first conduction path 31, 96, 33 momentarily shares current with the load contact. The control means is further adapted to interrupt the operating signal to the electromechanical switching means, and to await loss of the contact closed position signal CP on line 54. The control means 36 responds to loss of the CP signal, signaling opening of load contact 50, by interrupting the semiconductor switch means operating signal 38, whereby the conducting first conduction path 47 becomes non-conductive, thereby preventing failure.

As depicted in FIG. 2b, the semiconductor switching means 34 is typically comprised of one or more thyristors as discussed in "The RCA Solid State Power Circuits Designers Handbook", published by the RCA Solid State Division, Somerville, N.J., 08876, 1971. The thyristors in FIG. 2b are silicon controlled rectifiers (SCRs) 92, 94 connected between terminal 31 and terminal 33. A first SCR 92 conducts current from terminal 31 to terminal 33, and the second SCR 94 conducts current from terminal 33 to terminal 31. These SCRs are driven into conduction by relatively low power gate drive signals provided on lines 86, 88 to their respective gate terminals.

Figure 7A:
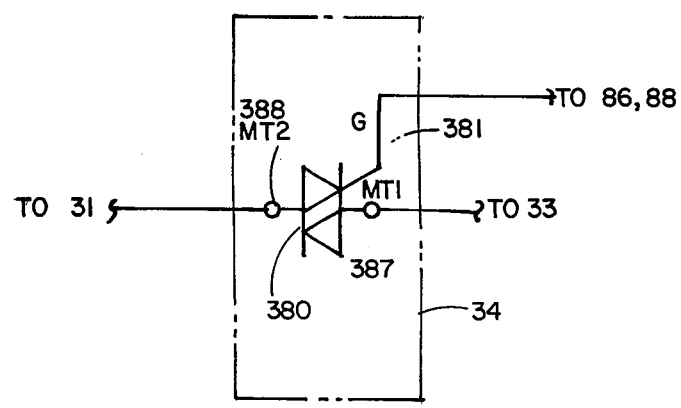
FIG. 7a is a schematic of an alternative semiconductor switching means using a TRIAC.

FIG. 7a depicts an alternative type of thyristor suitable for use as the semiconductor switching means 34 in the preferred embodiment comprising a TRIAC 380 having a first main terminal (MT1) 387 and a second main terminal (MT2) 388. MT1 is connected to terminal 33 and MT2 is connected to terminal 31. Gate terminal 381 is driven by signals equivalent in function to those signals provided on lines 86, 88.

Figure 7B:
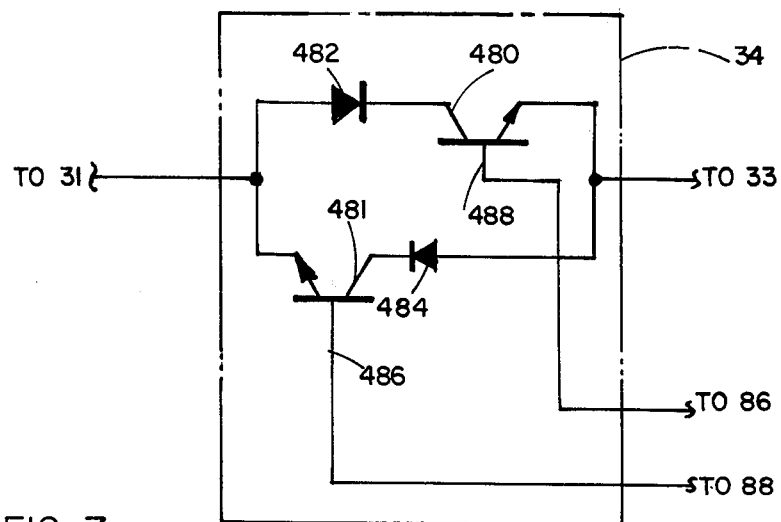
FIG. 7b is a schematic of an alternative semiconductor switching means using anti-parallel diode blocked transistors.

Referring to FIG. 7b, yet another semiconductor switch means is shown comprised of diode 482, 484 blocked anti-parallel transistors 480, 481. The diode blocked anti-parallel transistors are connected between terminal 31 and terminal 33. The first transistor 480, having base 488 conducts current from terminal 31 to terminal 33 and is protected against reverse current by first blocking diode 482 operating in series with the collector emitter circuit. The second transistor 481, having base 486 conducts current from terminal 33 to terminal 31 through second blocking diode 484 wired in series with the collector to emitter circuit of transistor 481. Anti-parallel transistors have the disadvantage of requiring more power to keep them conducting than is typically required by anti-parallel SCR's or TRIAC's, but provide the functional advantage of being able to interrupt conduction at any point within a conduction cycle.

Referring again to FIG. 2b, the electromechanical switch means 28 typically comprises a relay having a coil 51, load contacts 50 and position contacts 52. Current sharing resistor 48 is connected in series with load contacts 50 between terminal 31 and terminal 33.

Figure 8:
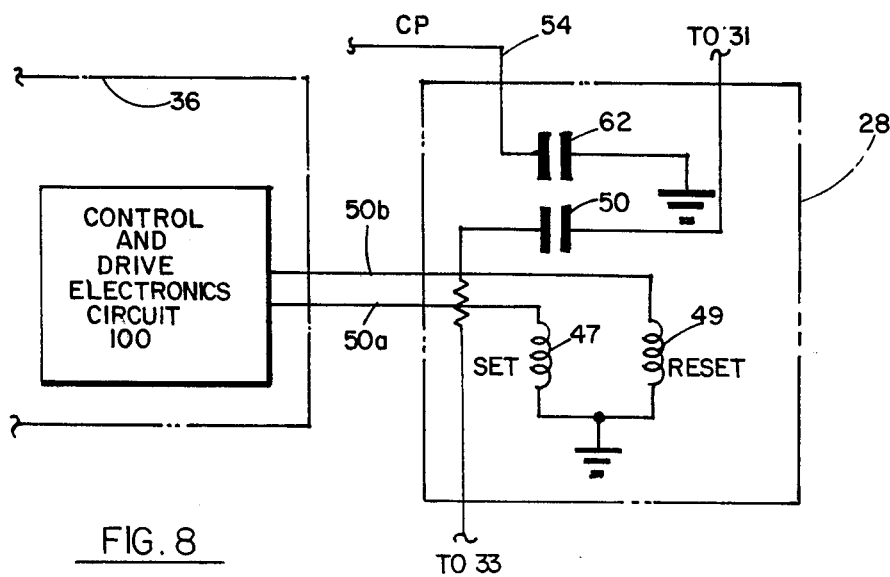
FIG. 8 is a schematic of an alternative electromechanical switching means using a latching relay.

In alternative embodiments, the relay is a latching relay as depicted in FIG. 8 having a set coil 47 and a reset coil 49. Line 50, used to provide relay drive signal to coil 51, is replaced by lines 50a providing a set pulse to set coil 47 and line 50b providing a reset pulse to reset coil 49 from CONTROL AND DRIVE ELECTRONICS CIRCUIT 100. The control means 36 is adapted to provide a set pulse on line 50a to the set coil 47 to transfer the latching relay to close the load contact 50 and the load contact position contact 62 in response to the electromechanical switching means operating signal on line 39. The control means 36 is also adapted to provide a reset pulse on line 50b to the reset coil 49 to transfer the relay to open the load contact 50 and the load contact position contact 62 in response to interruption of the electromechanical switching means operating signal on line 39.

The preferred embodiment control means 36 further includes a MICROCOMPUTER 98 having a predetermined program augmented to follow the flow chart of FIG. 3. The MICROCOMPUTER 98 is adapted to receive the ELECTRICAL COMMAND SIGNAL on line 26, the load contact closed position signal CP, on line 54 and the squared digital current amplitude signal on DATA BUS 78, and provides semiconductor switch means operating signal on line 38 and electromechanical switch means operating signal on line 39 to CONTROL AND DRIVE ELECTRONICS CIRCUIT block 100. Block 100 is further adapted to provide SCR gate drive signals on line 88 and line 86 to the gates of SCR 94 and SCR 92, respectively in response to a semiconductor switch means operating signal on line 38.

The predetermined program is adapted to provide a fast trip signal, a normal trip signal, the semiconductor switch means operating signal on line 38 and the electromechanical switch means operating signal on line 39, whereby the MICROCOMPUTER 98 controls closing and interrupting the first and second conduction paths from the alternating source voltage 22 to the load 24 in response to the ELECTRICAL COMMAND SIGNAL on line 26, the load contact closed position signal on line 54 and the squared digital current amplitude signal DATA BUS 78.

In an alternative embodiment as depicted in FIG. 8, the CONTROL AND DRIVE ELECTRONICS CIRCUIT block 100 is adapted to be responsive to the control means electromechanical switch means operating signal on line 39 to provide an electrical set pulse on line 50a to set coil 47 to transfer the latching relay to close the load contact 50 in response to the electromechanical switch means operating signal on line 39. Block 100 is further adapted to provide an electrical reset pulse on line 50b to reset coil 49 to transfer the latching relay to open the load contact 50 in response to interruption of the electromechanical switch means operating signal on line 39.

Simplified Flow Diagram

The microcomputer predetermined program is adapted to follow a sequence of steps depicted by the blocks comprising the simplified flow diagram of FIG. 3. As power is applied, the INITIALIZATION block 210 is entered for the purpose of initializing all registers and counters. The program then advances to the COMPUTE POWER PERIOD block 212 in which the program measures the time between control X signals and calculates the initializing constants required for a $\frac{3}{4}$ cycle time delay period for use when interrupting the semiconductor switching means operating signals.

The START block 214 provides a starting point for each program iteration. The program then advances to the TRIPPED or ON block 216 in which the program checks to determine if the Tripped flag or ON flag has been set. The ON flag is set as the electrical command signal occurs on line 26. A tripped flag is set if the program has determined that conditions for a fast trip or a normal trip have been met in a previous program iteration. If neither flag has been set the program exits to the right on path 217 to CONTROL INPUT block 218 in which the program checks the electrical command signal flag. An electrical command signal flag is set if an electrical command signal is present on line 26. If no electrical command signal is set the program advances to the right on path 219 to the RESET ZVC COUNT block 220 in which the program resets the ZVC counter to a binary three after which the program returns to the START block 214. Referring again to block 218, if the program determines that the on flag is set as a result of an electrical command signal on line 26, the program advances on path 222 to the TIME OUT CONTROL block 224 in which the program checks to see if the ZVC counter is zero. If the ZVC counter is not zero the program decrements the ZVC counter by one and advances to path 226, 228, 230 to the START block 214. Referring again to block 224, if the program determines that the ZVC counter is zero, the program advances on path 232 to NORMAL TURN-ON block 232.

The NORMAL TURN-ON block 232 is the starting point for all normal turn on sequences. The program next advances along path 234 to the SEQUENCE SCR DRIVE RELAY ON block 236 in which the program provides a semiconductor switch means operating signal on line 38 in synchronization with a CONTROL X signal on line 42, and also provides a concurrent electromechanical switch means operating signal on line 39.

After which the program advances on path 238 to WAIT FOR RELAY CLOSE block 240.

As the relay contact 50 closes, contact 52 provides a ground on the CP line 54 to MICROCOMPUTER 98. The grounded CP line provides a flag and allows the program to advance from block 240 to the ALL DRIVES OFF block 242 in which the program interrupts outputs providing the semiconductor switch means operating signal on line 38 to CONTROL AND DRIVE ELECTRONICS CIRCUIT block 100. Block 100 interrupts the gate drive signals on lines 88 and 86 to turn off SCRs 94 and 92 respectively. The program advances to the SET "ON" STATUS block 244 to provide an output signal from control means 36 to signal that the relay is transferred to the closed position. The program next returns to the start block 214 along path 246 228 and 230.

A normal turn off sequence begins with interruption of the ELECTRICAL COMMAND SIGNAL on line 26. The program advances from START block 214 to block 216. The program determines that the switch is ON and exits block 216 on path 248 to DISTINGUISH TRIPPED, NORMALLY ON, OR NORMAL TURN OFF block 250. Since a tripped flag has not been set and since the ELECTRICAL COMMAND SIGNAL on line 26 has been interrupted the program exits on path 252 to SCR DRIVES & REL OFF DR ON block 254 in which the program turns the semiconductor switch means operating signal on and interrupts the electromechanical switch means operating signal to reset the relay contact 50. The program advances on path 255 to WAIT FOR RELAY OPEN block 256 where the program awaits loss of the ground signal on the CP line 54 signaling opening of load contact 50.

The program advances to SEQUENCE SCR DRIVES OFF block 258 in which the program starts a ¾ cycle time delay concurrent with a control X signal and after which it interrupts the semiconductor switch means operating signal on line 38 turning off the SCRs 94, 92. The program advances to the CLEAR "ON" STATUS block 260 in which the program provides an external signal to indicate that the relay is reset. The program advances on path 261, 262, 263, 264 to START block 214.

The tripped flag is set by either a fast trip or a normal trip condition. If the tripped flag is set, the program cycles from block 250 on path 265 to CONTROL INPUT block 266. If the ELECTRICAL COMMAND SIGNAL is ON, the program follows the path of 267, 263, 264 to START block 214. The path leading to block 216, path 248, block 250, path 265 to block 266 is repeatedly followed until the ELECTRICAL COMMAND SIGNAL is interrupted. Interruption of the ELECTRICAL COMMAND SIGNAL causes the program to exit block 266 on path 268 to RESET TRIP block 270 in which the program resets the trip flag used to provide an external signal. The program advances from block 270 along path 272 to 262, 263, 264 to START block 214.

In the absence of an overload or shorted condition, the tripped flag remains reset. If the ELECTRICAL COMMAND SIGNAL is present, and if the electromechanical switch means is activated, the program repeatedly cycles from START block 214 to block 216, on path 248 to block 250, exiting on path 274 to path 264 and returning to START block 214.

Three Phase Electrical Switch Operation

Figure 4:
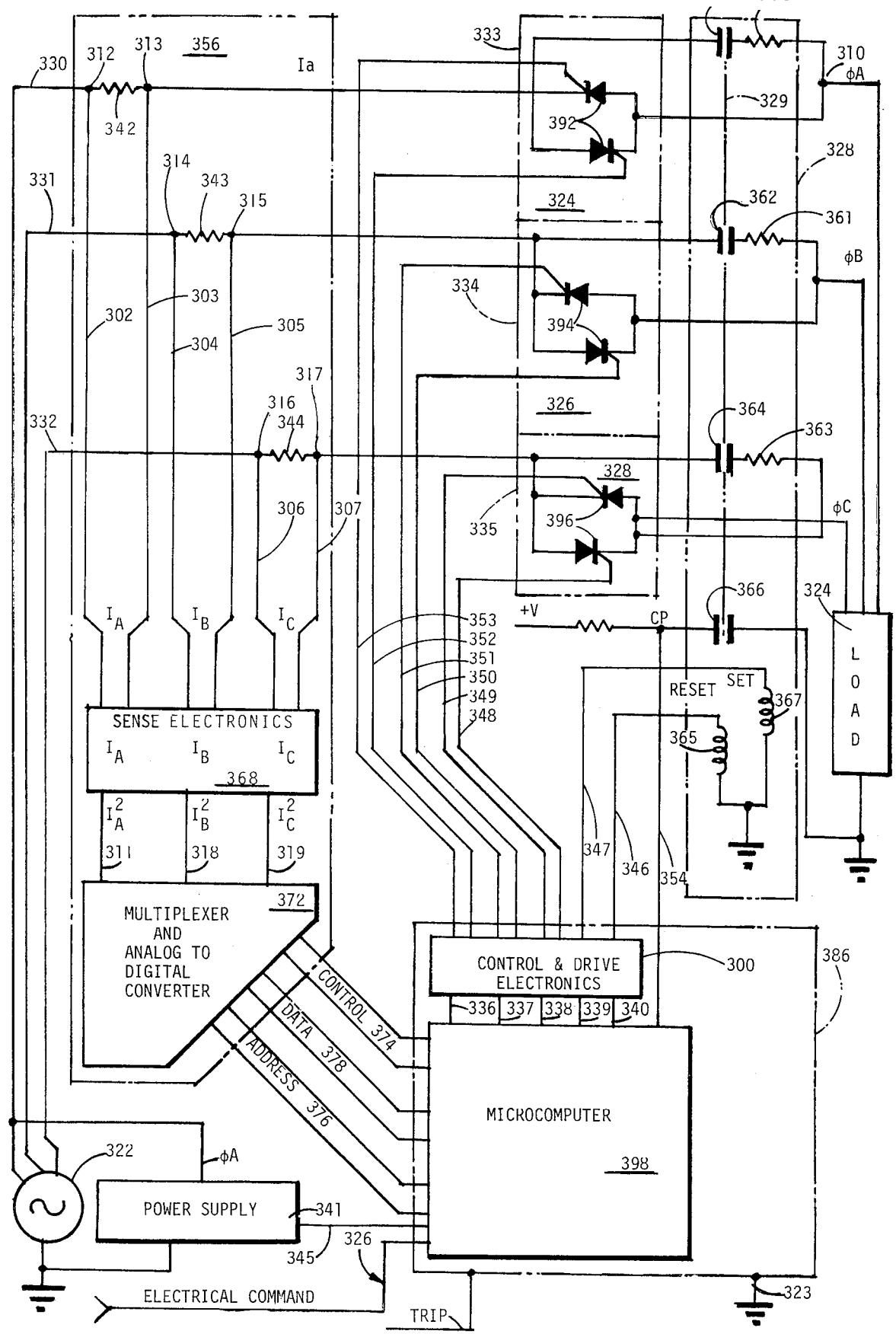
FIG. 4 is a block diagram of a three phase electrical switch.

Referring to FIG. 4 there is depicted an alternative embodiment of the invention electrical switch for controlling the application of a multiple phase alternating source voltage, such as the three phase alternating source voltage 322, to a load 324 under the control of an electrical command signal on line 326, resulting in the development of a load current in each source voltage phase, as in lines 330, 331 and 332, in response to the electrical command signal on line 326. The switch comprises a plurality of phase related semiconductor switching means 333, 334, 335, having a predetermined non-bounce switching characteristic, each phase related semiconductor switching means being connected in series with a respective alternating source voltage phase, i.e. 330, 331, 332 and each being responsive to a respective phase related semiconductor switching means operating signal provided on lines 336, 337 and 338. The semiconductor switching means 333, 334, 335 form respective phase related semiconductor conduction paths from each respective alternating source voltage phase 330, 331, 332 to the load 324.

Electromechanical switching means 328 having a plurality of phase related load contacts 360, 362, and 364 is depicted, each respective phase related load contact operating in parallel with a respective phase related semiconductor switching means 333, 334 335. The electromechanical switching means 328 is responsive to an electromechanical switching means operating signal, as for example on lines 339 and 340, to close the plurality of phase related load contacts 360, 362, 364, each respective phase related load contact operating in parallel with a respective phase related semiconductor switching means 333, 334, 335 to form a phase related parallel conduction path for connecting each respective alternating source voltage phase 330, 331, 332 to the load 324.

Control means 368 is responsive to the electrical command signal on line 326 for providing the respective phase related semiconductor switching means operating signals on lines 336, 337 and 338 and the electromechanical switching means operating signals on lines 339 and 340.

Power supply means 341 is coupled to a first phase, line 330, of the multiple phase alternating source voltage 322 and is adapted to provide a phase related first zero crossing signal on line 345 corresponding to the first phase alternating source phase voltage on line 330 crossing zero voltage having a first predetermined sequence of polarity change.

Electromechanical switching means 328 further includes a load contact position signal contact 366, the load contact position signal contact closing in synchronization with the plurality of phase related load contacts 360, 362, 364 and provides a load contact position signal CP. The control means 386 in response to the electrical command signal on line 326 and in response to the phase related first zero crossing signal on line 345 is further adapted to synchronize the respective phase related semiconductor switching means operating signals on lines 336, 337 and 338 to each respective phase related semiconductor switching means 333, 334, 335, in synchronized source phase voltage crossing zero voltage with a first predetermined sequence of polarity change relation, the control means 386 being further adapted to concurrently provide the electromechanical switching means operating signals on lines 339 and 340.

The control means 386 is further adapted to be responsive to interruption of the electrical command signal on line 326 to synchronize activation of the phase related semiconductor switching means operating signals on lines 336, 337 and 338 with interruption of the electromechanical switching means operating signals on lines 339 and 340 and to synchronize interruption of each respective phase related semiconductor switching means operating signals with the first phase alternating source phase voltage crossing zero voltage with a first predetermined sequence of polarity change and with loss of the load contact position signal CP interrupting the respective phase related semiconductor conduction paths subsequent to opening of the load contacts 360, 362 and 364. In response to the electrical command signal on line 326 the plurality of phase related semiconductor switching means 333, 334 and 335 provide a bounce free closure of the phase related conduction paths in synchronization with a first phase alternating source phase voltage crossing zero voltage with a first predetermined sequence of polarity change. In response to removal of the electrical command signal on line 326, the plurality of phase related semiconductor switching means 333, 334, 335 provide a noise free interruption of the phase related conduction paths subsequent to opening of the load contacts 360, 362 and 364 signaled by interruption of the load contact position signal CP, and in synchronization with the first phase alternating source phase voltage crossing zero voltage with a first predetermined sequence of polarity change.

The control means 386 is further adapted to synchronize termination of the respective phase related semiconductor switching means operating signals on lines 336, 337, 338 with closure of the load contact position signal contact 366, whereby the respective phase related semiconductor switching means 333, 334, 335 interrupt the respective phase related semiconductor conduction paths from each respective alternating source voltage phase on lines 330, 331, 332 to the load 324 subsequent to closure of the load contacts 360, 362, 364, thereby conserving the power required to activate the phase related semiconductor switching means.

The alternative embodiment of FIG. 4 includes a plurality of phase related current sharing resistors 359, 361, 363 being connected in series with a respective phase related load contact 360, 362, 364, the respective series connected phase related load current sharing resistor and phase related load contact operating in parallel with a respective phase related semiconductor switching means 333, 334, 335 forming phase related parallel conduction paths for connecting each respective alternating source voltage phase on lines 330, 331, 332 to the load 324 whereby each respective phase related current sharing resistor 359, 361, 363 operates to provide load current sharing between the respective phase related load contact 360, 362, 364 and the phase related semiconductor switching means. The respective phase related load current sharing resistors are particularly adapted to force a division of fault current flowing through both a load contact and a parallel semiconductor switching means to reduce the stress on the load contact until the fault is cleared.

Load current sensing means 356 comprises a plurality of phase related load current sensing means further comprising resistors 342, 343, 344, each respective phase related load current sensing means being interposed in series with a respective multiple phase alternating source voltage phase load current conduction path for providing a respective phase related current amplitude signal. Phase related current amplitude signals are provided between terminals 312 and 313, 314 and 315, 316 and 317. Lines 302 and 303, 304 and 305, 306 and 307 connect the respective load current sensing terminals to the sense electronics block 368. Block 368 provides scaling circuitry for each respective voltage proportional to a respective load current.

The control means 386 is further adapted to be responsive to the phase related current amplitude signals measured at terminal 312 with respect to 313 and at terminal 314 with respect to 315 and at terminal 316 with respect to 317 for comparing the current amplitude signals IA, IB, IC with a first predetermined current amplitude threshold limit, the control means being further adapted to being responsive to the phase related current amplitude signals IA, IB, IC exceeding the first predetermined current amplitude threshold limit for providing a fast trip signal. The control means is responsive to the fast trip signal to interrupt the phase related semiconductor switching means operating signals on lines 336, 337, 338 and the electromechanical switching means operating signals on lines 339, and 340, whereby the phase related semiconductor switching means 333, 334, 335 and the electromechanical switching means phase related load contacts 360, 362, 364 interrupt the load current path to the load 324.

The phase related load current sensing means 356 further comprises: means for converting the phase related current amplitude signals into phase related digital current amplitude signals typically by the use of an analog to digital converter as depicted in block 372. The control means 386 is responsive to the phase related digital current amplitude signals provided by block 372 on data bus 378 in response to control signals on control bus 374 from microcomputer 398. Block 372 includes a multiplexer for sequentially selecting each phase related current amplitude signal in response to a digital address received on address bus 376 from microcomputer 398, connecting the analog to digital converter to the phase related current amplitude signal designated for conversion to a digital value. The control means 386 is adapted to compare the phase related digital current amplitude signals with a first predetermined digital current amplitude threshold limit. The control means 386 is responsive to any phase related digital current amplitude signal exceeding a first predetermined digital current amplitude threshold limit for providing a fast trip signal.

The control means includes, accumulator means, having an accumulator, typically provided by microcomputer 398. In an alternative embodiment, microcomputer 398 typically provides means for sampling the phase related digital current amplitude signals, squaring each sampled phase related digital current amplitude signal, adding each respective squared phase related digital current amplitude signal to the accumulator, subtracting a predetermined constant from the accumulator after each addition of the sampled squared phase related digital current amplitude signal, comparing each accumulator value with a second predetermined constant threshold limit, providing a normal trip signal in response to the accumulator value exceeding the second predetermined constant threshold limit, the control means being responsive to the normal trip signal to interrupt the phase related semiconductor switching means operating signals and the electromechanical switching means operating signal, whereby the respective phase related semiconductor switching means 333, 334, 335 and the electromechanical switching means load contacts 360, 362, 364 interrupt the phase related load current conduction paths to the load 324. In alternative embodiments the accumulator means further includes, a plurality of phase related accumulators as typically provided by a predetermined program. The control means 386 further includes, means for sampling the phase related digital current amplitude signals provided on data bus 378, squaring each sampled phase related digital current amplitude signal, adding each respective squared phase related digital current amplitude signal to a respective phase related accumulator, subtracting a predetermined constant from each respective phase related accumulator after each addition of the sampled squared phase related digital current amplitude signal, comparing each respective phase related accumulator value with a second predetermined constant threshold limit, providing a normal trip signal in response to the accumulator value exceeding the second predetermined constant threshold limit, whereby the respective phase related semiconductor switching means 333, 334, 335 and the electromechanical switching means load contacts 360, 362, 364 interrupt the respective phase related load current conduction paths to the load 324.

In a preferred alternative embodiment, the phase related load current sensing means 356 is further adapted to provide respective squared phase related current amplitude signals $I_{A2}$, $I_{B2}$, $I_{C2}$ on lines 311, 318, 319 leading from the sense electronics block 368 to the multiplexer and analog to digital converter block 372.

The control means 386 is further adapted to be responsive to the squared phase related current amplitude signals $I_{A2}$, $I_{B2}$, $I_{C2}$ for comparing the squared amplitude signals with a first predetermined squared current amplitude threshold limit. The control means is further adapted to be responsive to the squared phase related current amplitude signals exceeding the first predetermined squared current amplitude threshold limit for providing the fast trip signal, whereby the phase related semiconductor switching means 333, 334, 335 and the electromechanical switching means phase related load contacts 360, 362, 364 interrupt the load current path to the load 324.

The phase related load current sensing means 356 further comprises: means for converting the squared phase related current amplitude signals $I_{A2}$, $I_{B2}$, $I_{C2}$ into squared phase related digital amplitude signals typically transmitted to microcomputer 398 on data bus 378. The control means is responsive to the squared phase related digital current amplitude signals for comparing the squared phase related digital current amplitude signals with a first squared predetermined digital current amplitude threshold limit. The control means is responsive to any squared phase related digital current amplitude signal exceeding the first predetermined squared digital current amplitude threshold limit for providing a fast trip signal.

The control means 386 further includes, squared accumulator means having means for sampling the squared phase related digital current amplitude signals. Microcomputer 398 having a predetermined program is typically adapted to provide the required squared accumulator means having means for sampling the squared phase related digital current amplitude signals, and also adding each respective squared phase related digital current amplitude signal to the squared accumulator, subtracting a predetermined constant from each squared accumulator after each addition of the sampled squared phase related digital current amplitude signal, comparing each squared accumulator value with a second predetermined constant threshold limit providing a normal trip signal in response to the squared accumulator value exceeding the second predetermined constant threshold limit, the control means 386 being responsive to the normal trip signal to interrupt the phase related semiconductor switching means operating signals on lines 336, 337, 338 and the electromechanical switching means operating signals on lines 339 and 340, whereby the respective phase related semiconductor switching means 333, 334, 335 and the electromechanical switching means phase related load contacts 360, 362, 364 interrupt the phase related load current conduction paths to the load 324.

The control means further includes, microcomputer 398 having a predetermined program adapted to provide accumulator means having, means for sampling the squared phase related digital current amplitude signals, adding each respective squared phase related digital current amplitude signal to the respective squared phase related accumulator, subtracting a predetermined constant from each respective squared phase related accumulator after each addition of the sampled squared phase related digital current amplitude signal, comparing each respective squared phase related accumulator value with a second predetermined constant threshold limit, providing a normal trip signal in response to the accumulator value exceeding the second predetermined constant threshold limit, the control means being responsive to the normal trip signal to interrupt the phase related semiconductor switching means operating signals on line 336, 337, 338 and the electromechanical switching means operating signals on lines 339 and 340 whereby the respective phase related semiconductor switching means 333, 334, 335 and the electromechanical switching means phase related load contacts 360, 362, 364 interrupt the phase related load current conduction paths to the load 324.

The control means typically includes; microcomputer 398 having a predetermined program, the microcomputer being adapted to receive the electrical command signal on line 326, the load contact closed position signal CP on line 354 from contact closed position signal contact 366, the phase related first zero crossing signal from power supply 341 on line 345, and the squared phase related digital current amplitude signals on data bus 378. The predetermined program is further adapted to provide the plurality of squared phase related accumulators, the fast trip signal, the normal trip signal, the semiconductor switching means operating signal on lines 336, 337, 338 and the electromechanical switching means operating signal on lines 339 and 340 to control and drive electronics block 300, whereby the microcomputer controls closing and interrupting the respective phase related semiconductor switching means 333, 334, 335 and the electromechanical phase related load contacts 360, 362, 364.

In another alternative embodiment, the control means 386 further includes; microcomputer 398 having a predetermined program, the microcomputer 398 being adapted to receive the electrical command signal on line 326, the load current closed position signal CP on line 354, the phase related first zero crossing signal from power supply 341 on line 345, and the phase related digital current amplitude signals on data bus 378, the predetermined program being further adapted to provide the fast trip and normal trip threshold constants, the plurality of phase related accumulators, the fast trip signal, the normal trip signal, the semiconductor switching means operating signals on lines 346, 337, 338 and the electromechanical switching means operating signal on lines 339 and 340 to control the drive electronics block 300, whereby the microcomputer controls closing and interrupting the respective phase related semiconductor switching means 333, 334, 335 and the electromechanical switching means phase related load contacts 360, 362, 364.

Simplified Flow Diagram for Three Phase Electrical Switch

Figure 5A:
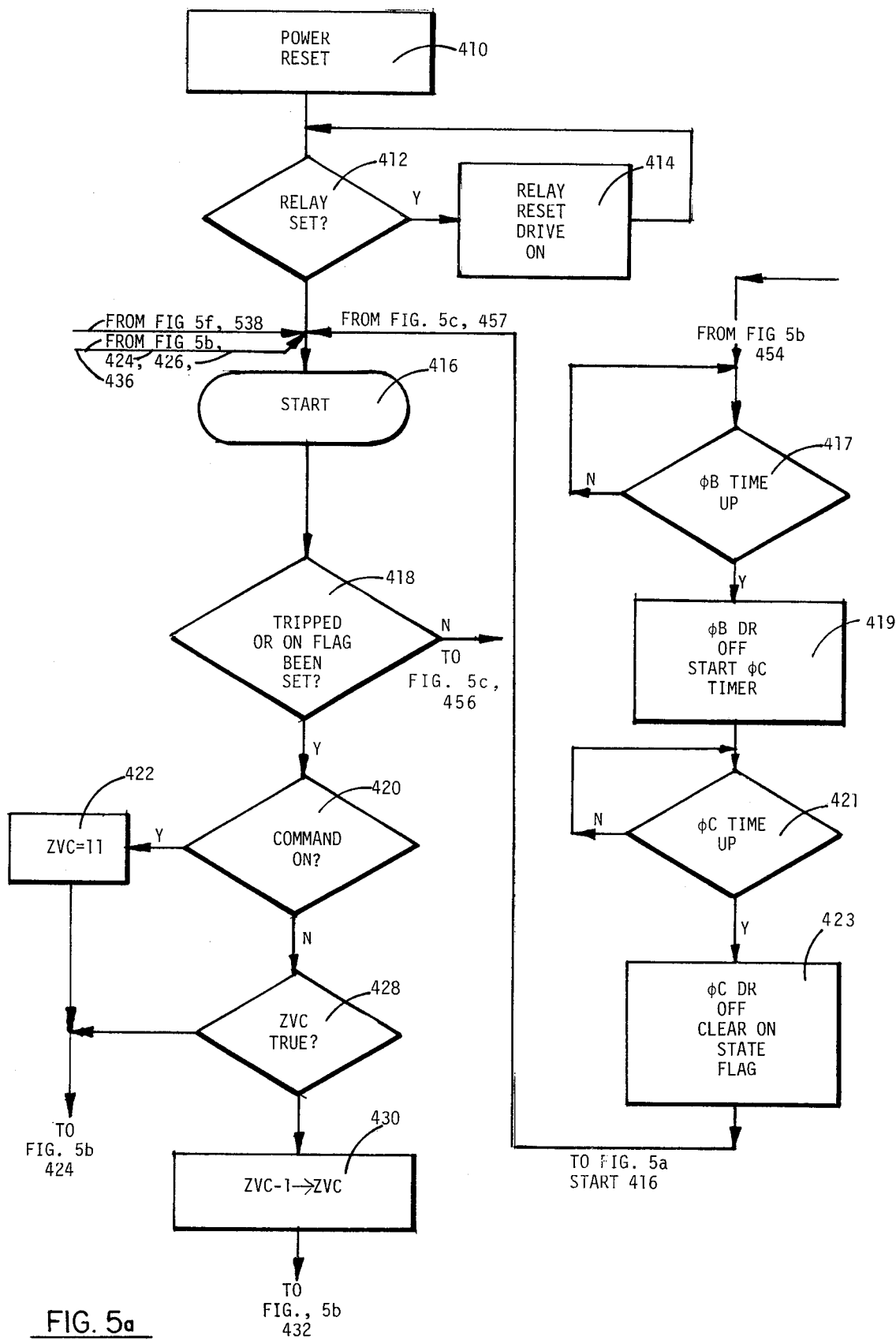
FIG. 5a through 5f is a flow diagram for a three phase electrical switch.

The three phase embodiment of the invention electrical switch 310 appearing in FIG. 4, having control means 336 containing microcomputer 398 operates in accordance with a predetermined program following the operational steps depicted by the block diagram of FIG. 5a, b, etc. The microcomputer used in this preferred embodiment is a Rockwell R6500/1 having four 8 bit ports adaptable for input or output data. This device also provides 2096 bytes of masked ROM and 128 bytes of RAM and a timer used for controlling ⅛ and ⅜ cycle time delays.

Referring to FIG. 5a, as power is first applied to the microcomputer, an external POWER RESET signal 408 is applied to start the program at a predetermined instruction identified as block 410. The load contact position signal, CP, is sensed at an input port, (i.e. line 354) to determine if the relay is set. The RELAY SET decision, block 412, provides a yes path to the RELAY RESET DRIVE ON block 414. An output port is set to signal the CONTROL AND DRIVE ELECTRONICS 300 (FIG. 3) to provide pulse to the latch relay 330 RESET coil 365 to reset the latch relay 329.

TRIPPED OR ON CYCLE, Three Phase

The program begins at, and repetitively returns to the START block 416. The program advances from block 416 to the TRIPPED OR ON FLAG block 418.

Flags are predetermined bits in predetermined memory locations that are set or reset by operation of the program or by operation of external control signals acting on a designated input/output bit lines or ports used by microprocessor 398. These inputs include signals such as the electrical command signal on line 326, the control X or zero crossing signal on line 345 and the CP signal on line 354.

The TRIPPED OR ON flag subroutine of block 418 checks the TRIPPED and ON flags and advances to the COMMAND ON block 420 if the TRIPPED flag or the ON flag is set. The TRIPPED flag is set if the invention electrical switch has been previously tripped due to a fast trip signal or a normal trip signal, and if the TRIPPED flag has not been reset. The TRIPPED flag is reset by interruption of the electrical command signal. The ON flag is set if the electrical command signal is or was present and if the ON flag has not been reset.

The program exits block 420 to the ZVC=11 block 422 if the electrical command signal on line 326 has set the ON flag to on. The ZVC register is set to a binary value of three in block 422, after which the program advances to the TRIPPED block 424. If the TRIPPED flag is not set, the program advances to the MEASURE I block 426, which is an exit and re-entry point for the current measurement subroutine of FIG. 5e in which the program makes a sample measurement of each phase current to load 324. After completing the current measurement program of block 426, the program returns to START block 416. If the TRIPPED flag of block 424 is set, current measurements are not made and the program immediately returns to START block 416.

Returning to block 420, if the electrical command signal on line 326 is not present, the program advances to the ZVC TRUE block 428. This path is followed if the invention electrical switch has been ON and the switch is being commanded off; or, alternatively, if the switch has been tripped, and the user is reseting the switch. The program checks the ZVC flag and exits to TRIPPED block 424 if the TRIPPED flag is not set. The ZVC flag is set in response to a pulse on line 345 from the Power Supply 341 in synchronization with each cycle of the first phase of the multiple phase alternating source voltage crossing zero voltage having a first predetermined sequence of polarity change.

As a ZVC signal accrues, the program advances to the ZVC−1→ZVC block 430 where the ZVC counter is decremented. After three zero crossing signals have accrued, the program validates that the electrical command signal has been removed as it advances past the ZVC=0 block 432 to the TRIPPED block 434. The RESET TRIP FLAG block 436 is entered if the switch was tripped, and the electrical command signal is now removed for a period in excess of three zero crossing signals.

NORMAL TURN-OFF SEQUENCE, Three Phase

Figure 5B:
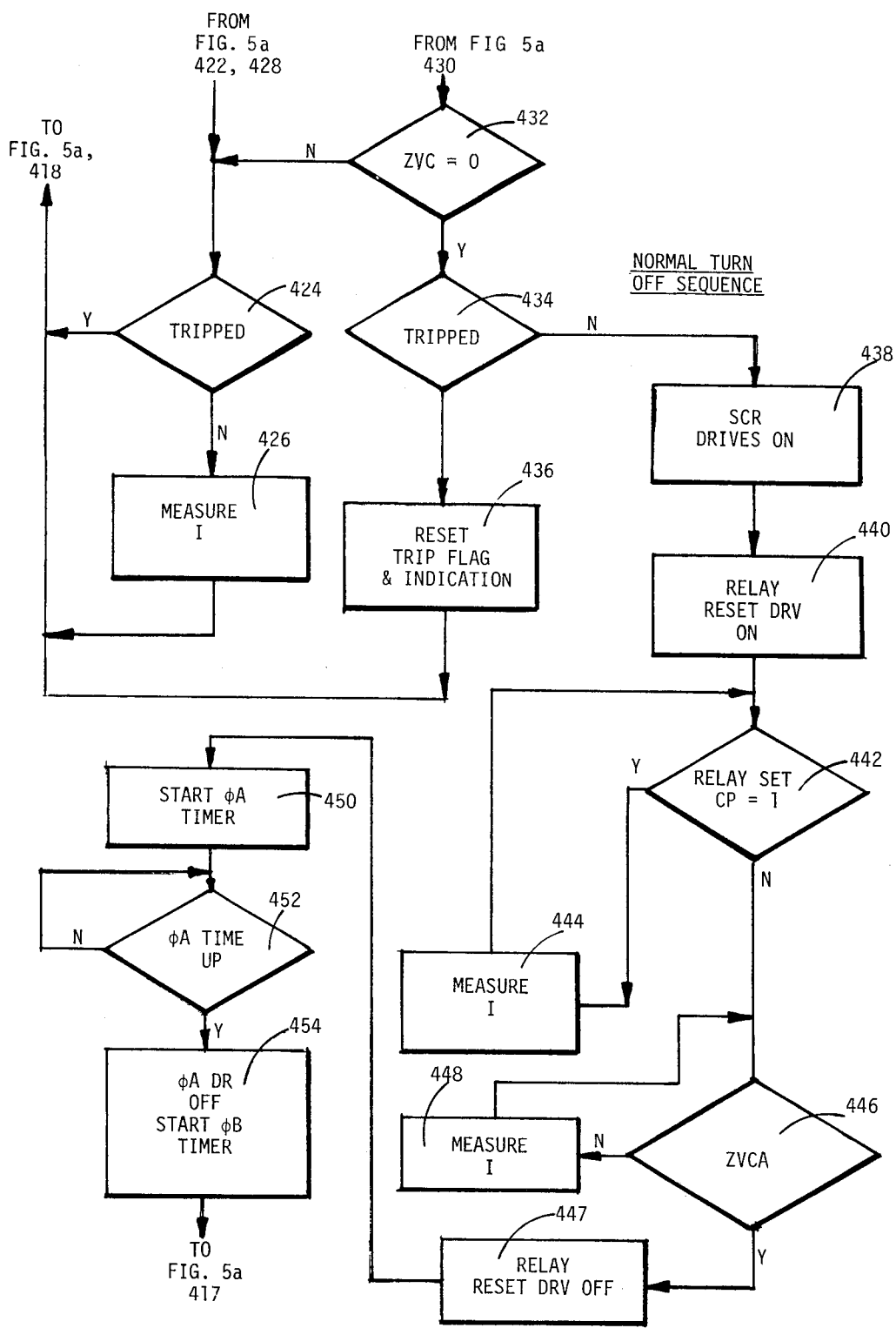

Referring to FIG. 5b, a normal turn-off sequence after a period of operation without being TRIPPED, takes the program from block 434 to the SCR DRIVES ON block 438 where output port lines are set to cause the CONTROL and DRIVE ELECTRONICS block 300 of FIG. 4 to provide the signals required to turn-on the semiconductor switching means 333, 334, 335 depicted as anti-parallel connected SCRs 392, 394, 396.

After advancing to the RELAY RESET DRV ON block 440 a signal is provided to CONTROL & DRIVE ELECTRONICS block 300 on line 340, and a signal is provided on line 346 to reset coil 365 to reset the relay. The program then advances to RELAY SET block 442 and circulates through the MEASURE I block 444 until the load contact position signal, CP, on line 354 increases to V+ or a logic zero signaling that the load contacts 360, 362, and 364 have opened, after which the program advances to the ZVCA block 446. At this step in the normal turn-off sequence, load contacts 360, 362 and 364 are open and current is still passing through the semiconductor switching means 333, 334 and 335 which are on and remain to be cycled off in sequence as current passing through each respective phase approaches zero having a first predetermined sequence of polarity change. The program references the turn off of the semiconductor switching means to a phase related first zero crossing signal corresponding to the first phase alternating source phase voltage crossing zero voltage having a first predetermined sequence of polarity change from power supply 341 on line 345 to microcomputer 398. To establish this reference timing, the program repetitively cycles from the ZVCA block 446 to the MEASURE I block 448, then returning to the ZVCA block 446 until the required zero crossing signal is provided on line 345.

RELAY RESET DRV OFF block 447 is next entered in which the signal on line 340 to block 300 is interrupted thereby terminating the drive to reset coil 365. The embodiment of FIG. 4 depicts semiconductor switching means 333, 334 and 335 using anti-parallel SCRs 392, 394 and 396. Each anti-parallel SCR pair is driven into conduction by drive signals on lines 348, 349, 350, 351, 352, and 353 applied to the respective SCR gates without interruption. The total time interval required for this uninterrupted application of SCR drive signal is relatively short, lasting only for as long as required to first turn-on the SCRs, to reset relay 328, to open load contacts 360, 362 and 364 and to then cycle the SCRs off. The SCRs turn off after the gate drive signals are interrupted and as load current passing through them reverses. The relative source voltage phase angle at which a respective phase current reverses depends on the reactance of the load 324.

The program of FIG. 5 is adapted to accommodate inductively reactive loads by providing a $\frac{3}{4}$ cycle delay interval measured from each respective alternating source phase voltage crossing zero voltage having a first predetermined sequence of polarity change. Microcomputer 398 establishes reference zero voltage crossing points for phase B and phase C in relation to the phase A crossing signal received on line 345.

Referring again to FIG. 5b, after interrupting the signal to the relay reset coil 365, the program advances from block 447 to the START ØA TIMER block 450 wherein a timer provides a delay interval of $\frac{3}{4}$ cycle interval. After the required $\frac{3}{4}$ cycle interval, the program advances from the ØA TIME UP block 452 to the ØA DR OFF, START ØB TIMER block 454 wherein the ØB timer is initialized with a one third cycle time delay. The block diagram continues at the upper right hand side of FIG. 5a where the ØB and ØC SCRs are turned off in similar fashion prior to returning to the program START block 416. The program provides the desired result of interrupting each respective alternating source phase voltage operating signal $\frac{3}{4}$ cycle after each respective alternating source phase voltage crosses zero voltage having a first predetermined sequence of polarity change by referencing the interruption events to the first phase voltage crossing zero voltage having a first predetermined sequence of polarity change and providing a first $\frac{3}{4}$ cycle time delay for the interruption of the first phase followed by two additional delays of one third cycle for the second and third phase source voltage operating signals respectively. This program feature eliminates the circuitry which would be necessary for detecting each respective alternating source phase voltage crossing zero volts having a first predetermined sequence of polarity change.

NORMAL TURN-ON-FIRST CYCLE, Three Phase

Figure 5C:
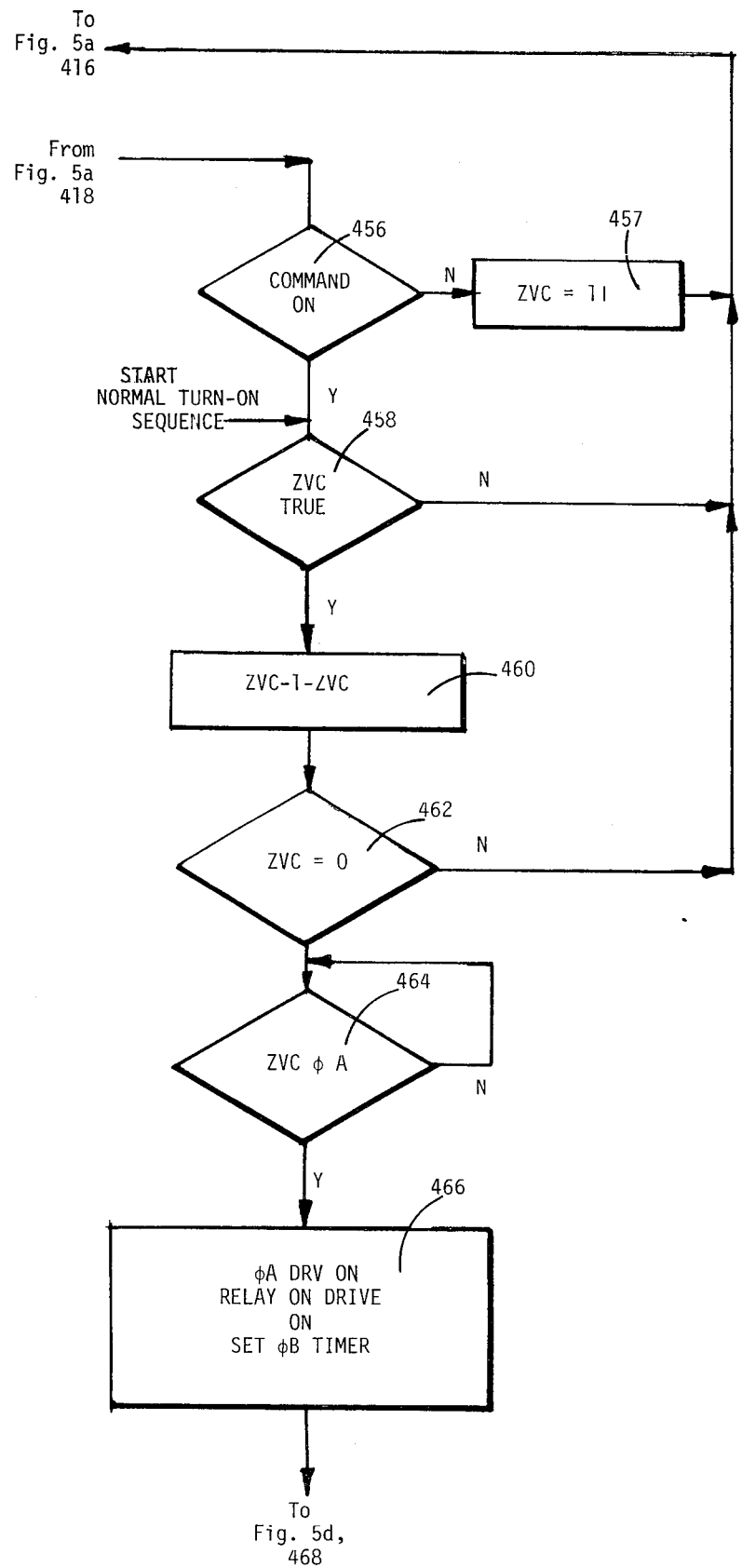

Referring again to the TRIPPED OR ON FLAG block 418 of FIG. 5a, if the TRIPPED or ON flags are not set, the program advances to the right to the COMMAND ON block 456 shown on FIG. 5c. If the electrical command signal of line 326 is not present, the program exits block 456 to the ZVC=11 block 457 and then returns to START block 416. This path is followed repetitively until the electrical command signal of line 326 is present. The ZVC=11 block 457 is used to initialize the ZVC counter to a binary three (11).

The program advances from block 456 to the ZVC TRUE? block 458 if the electrical command signal is present. The program repetitively exits block 458 to the right, to START block 416, to TRIPPED or ON block 418, to COMMAND ON block 456 and then back to ZVC TRUE? block 458 until a zero crossing signal is sensed on line 345, having a first predetermined sequence of polarity change.

As the ZVC TRUE block 458 is exited, the ZVC−1→ZVC block 460 is entered and the ZVC counter is decremented. The program continues to return to the beginning of this loop at block 456 until the ZVC counter is zero.

By decrementing the ZVC counter three times with the electrical command signal present, the program provides a predetermined delay of three zero crossing periods before responding to the electrical command signal. Interruption of the electrical command signal or non-valid electrical command signals due to transient noise effects are filtered out by the computer program because each time block 462 is exited prior to ZVC=0, block 456 is entered and unless the electrical command signal remains valid, the counter is reset to a binary three and the countdown restarted.

After passing through the ZVC=0 block 462 to the ZVCØA block 464, the microcomputer waits for a zero crossing signal on the ØA source voltage having a first predetermined sequence of polarity change. As this event takes place, the program advances to the ØA DRV ON block 466 and sets the required output port bits to turn-on the semiconductor switching means for the phase A source voltage to the load via the CONTROL & DRIVE ELECTRONICS 300. The program also turns on output port bits to set the electromechanical switching means 330 in FIG. 4 by providing a pulse to relay SET coil 367 from the CONTROL & DRIVE ELECTRONICS 300.

The program also sets the ØB TIMER prior to leaving block 466. This timer provides a $\frac{1}{3}$ cycle time delay, the delay required to synchronize the operating signal for the ØB SCRs with the phase A source voltage crossing zero volts having a first predetermined sequence of polarity change. In this preferred embodiment all zero crossing events are measured with respect to the phase A source voltage crossing zero volts. Each individual phase could be monitored for their respective zero voltage crossing but this would require unnecessary added circuit complexity.

The ØB TIME UP block 468 provides a monitor function. Prior to the ØB timer timing out, the program repetitively passes through the MEASURE I block 470. As the ØB timer times out, the ØB source voltage completes its zero voltage crossing having a first predetermined sequence of polarity change. The program then advances to the ØB DRV ON SET ØC TIMER block 472 in which the output port is activated to turn on the ØB semiconductor switching means operating signal and sets the ØC time to provide a $\frac{1}{3}$ cycle time delay.

MEASURE I SUBROUTINE

Figure 5D:
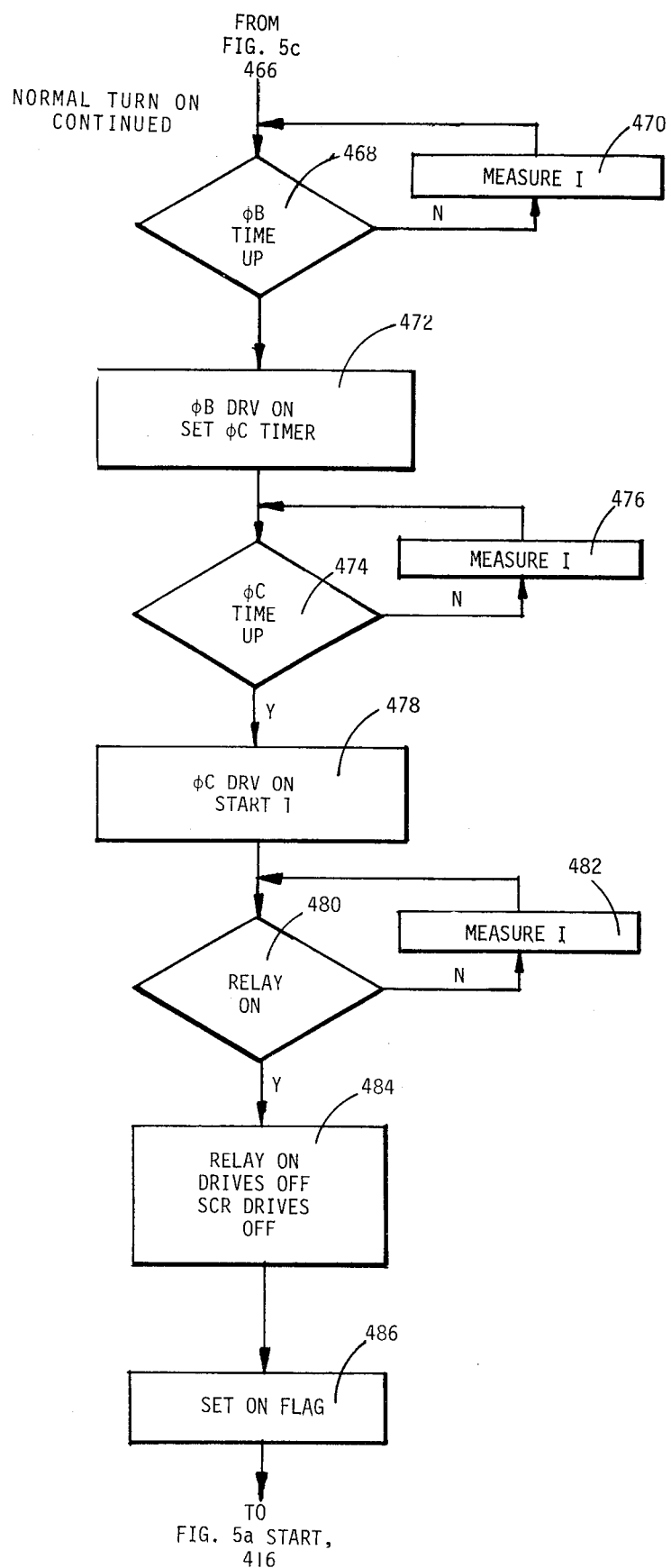
Figure 5E:
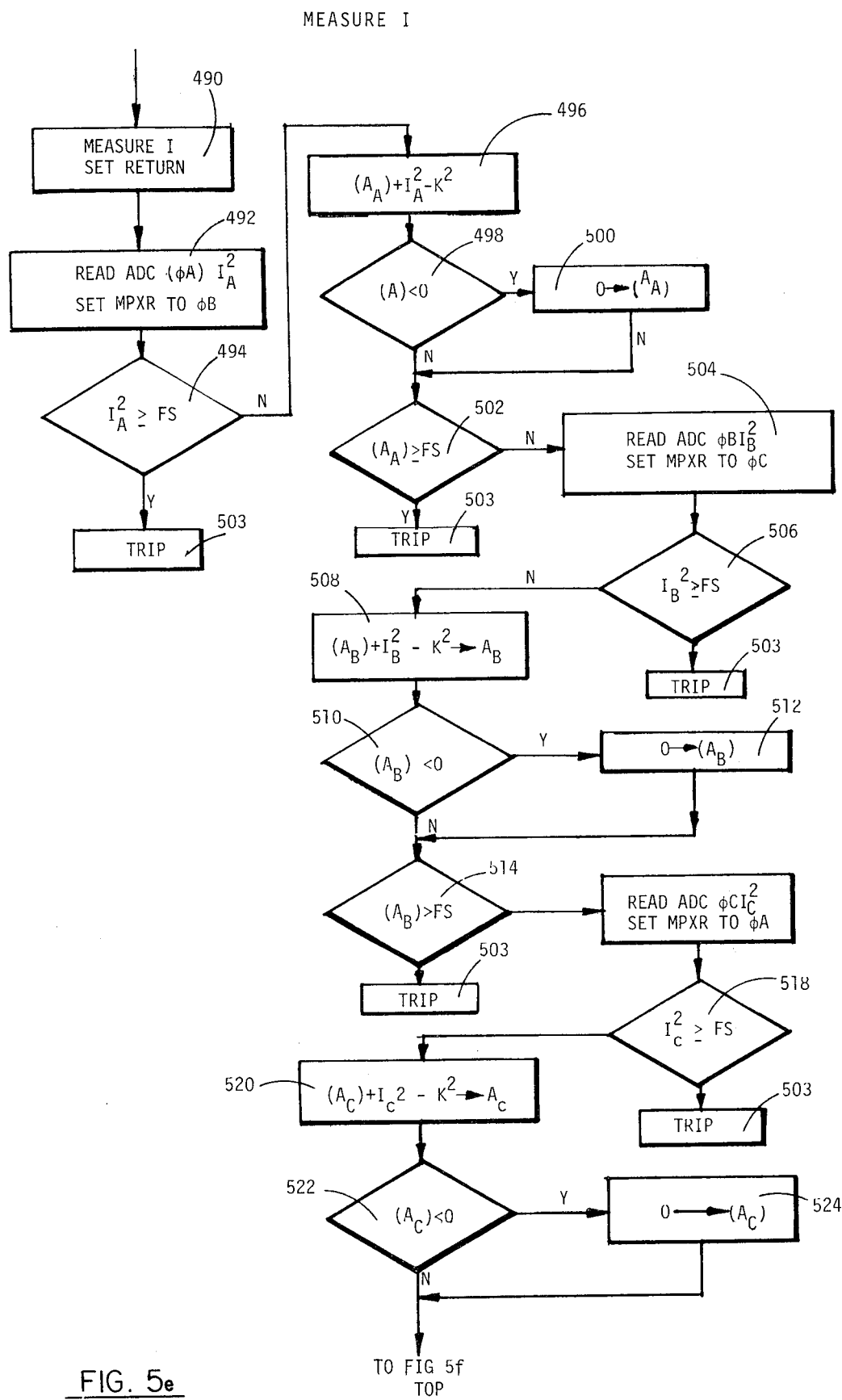

The MEASURE I block designates an entry point to the subroutine of FIG. 5e for measuring the individual phase currents. In a three-phase, 400 Hz, system each phase current is typically measured five times in each half-cycle period.

The program enters the MEASURE I subroutine from several points. The subroutine program provides the steps required for initializing the subroutine upon entry into the subroutine to provide exit instructions to enable the microcomputer to return from the subroutine to the next instruction in the main program after completion of the subroutine.

The MEASURE I subroutine of FIG. 5e proceeds from the MEASURE I, SET RETURN block 490 entry point to the READ ADC ØA I² block 492. Referring to FIG. 4, load current $I_A$ is sensed by the ØA sense resistor 342, the sense voltage, proportional to ØA load current being fed by leads 302, 303 to the $I_A$ input to SENSE ELECTRONICS block 368. Block 368 provides continuous signals, proportional to the square of each phase load current to the MULTIPLEXER AND ANALOG TO DIGITAL CONVERTER block 372. CONTROL BUS 374 contains dedicated lines to carry required control logic signals from the respective microcomputer port to the CONTROL INPUT of the MULTIPLEXER & ANALOG TO DIGITAL CONVERTER 372. This control logic signal causes the MULTIPLEXER 372 to sense the $I_{A2}$ input and to digitize the amplitude of the $I_{A2}$ signal.

The DATA bus 378 carries the digital word representing the amplitude of the $I_{A2}$ signal to the respective port of the microcomputer 398 control means 386.

The ADDRESS bus 376 carries digital information from a microcomputer 398 port to the MULTIPLEXER 372 to direct the MULTIPLEXER 372 to select the correct current signal.

Referring now to FIG. 5e, and the MEASURE I subroutine block 492, the program enters the READ ADC ØA $I_{A2}$ block 492 and sets the required output port bits to send the required digital signal along CONTROL BUS 374 and ADDRESS BUS 376 to command the MULTIPLEXER 372 to transmit the digitized amplitude of $I_{A2}$ on DATA BUS 372 to MICROCOMPUTER 398. The block 492 subroutine sets the address register for the multiplexer (MPXR) to select the signal $I_{B2}$ on line 318 prior to advancing to the $I_{A2} >$ FS block 494

If an overload is present, and is severe enough to cause the digital value of $I_{A2}$ to exceed that of a first predetermined current amplitude threshold limit, FS, the program exits block 494 to the TRIP block 503. The exit from block 494 to block 503 comprises entry into the fast trip subroutine in response to a fast trip signal.

Continuing with FIG. 5e, if $I_{A2}$ is not greater than the predetermined FS limit, the subroutine advances to the $(A_A) + I_{A2} - K^2$ block 496. The $(A_A)$ term represents the last value of the phase A current register or accumulator stored for processing phase A current data. $K^2$ is a predetermined constant that is subtracted from the sum of the preceeding value of the A register $(A_A)$ and $I_{A2}$.

After subtracting $K^2$ from $(A_A) + I_{A2}$, the program advances from block 496 to the $A < 0$ block 498 where $(A_A)$ is tested for a negative value. The $(A_A)$ accumulator will be negative if the load current $I_{A2}$ is repetitively less than $K^2$.

If the contents of the $(A_A)$ accumulator is negative, the program advances to the $0 \rightarrow A_A$ block where the $(A_A)$ accumulator is set to zero. The value of $K^2$ is selected to be equal to or to slightly exceed the per phase rating of the switch. As $I_{A2}$ begins to exceed the switch rating, the sum in the $(A_A)$ accumulator begins to rise increasing from one measure cycle to the next until the value remaining in the $(A_A)$ accumulator exceeds FS. The program exits block 502 to the TRIP block 503 if $(A_A) >$ FS. The exit from block 502 to block 503 comprises entry into the normal trip subroutine in response to a normal trip signal. The sequence of events that occur after entering the trip subroutine block 503 are not related to or dependent on, the block from which TRIP subroutine block 503 is entered. The two operations of a normal trip and a fast trip are distinguished from each other only by the process leading to them.

If the value of the $(A_A)$ accumulator is not greater than FS, the program exits block 502 and enters the READ ADC ØBI$_{B2}$ block 504 which functions identically to the READ ADC ØAI² block 492 described previously. Blocks identical to those already discussed are provided for sampling the $I_{B2}$ and the $I_{C2}$ values, and for providing a fast trip exit from blocks 506 and 518 or for providing a normal trip from blocks 514 or block 526. Blocks 508 and 520 are analogous in function to 496, blocks 512 and 524 are analogous to 500, blocks 514 and 526 are analogous to block 502 and block 510 and 522 are analogous to block 498.

Figure 5F:
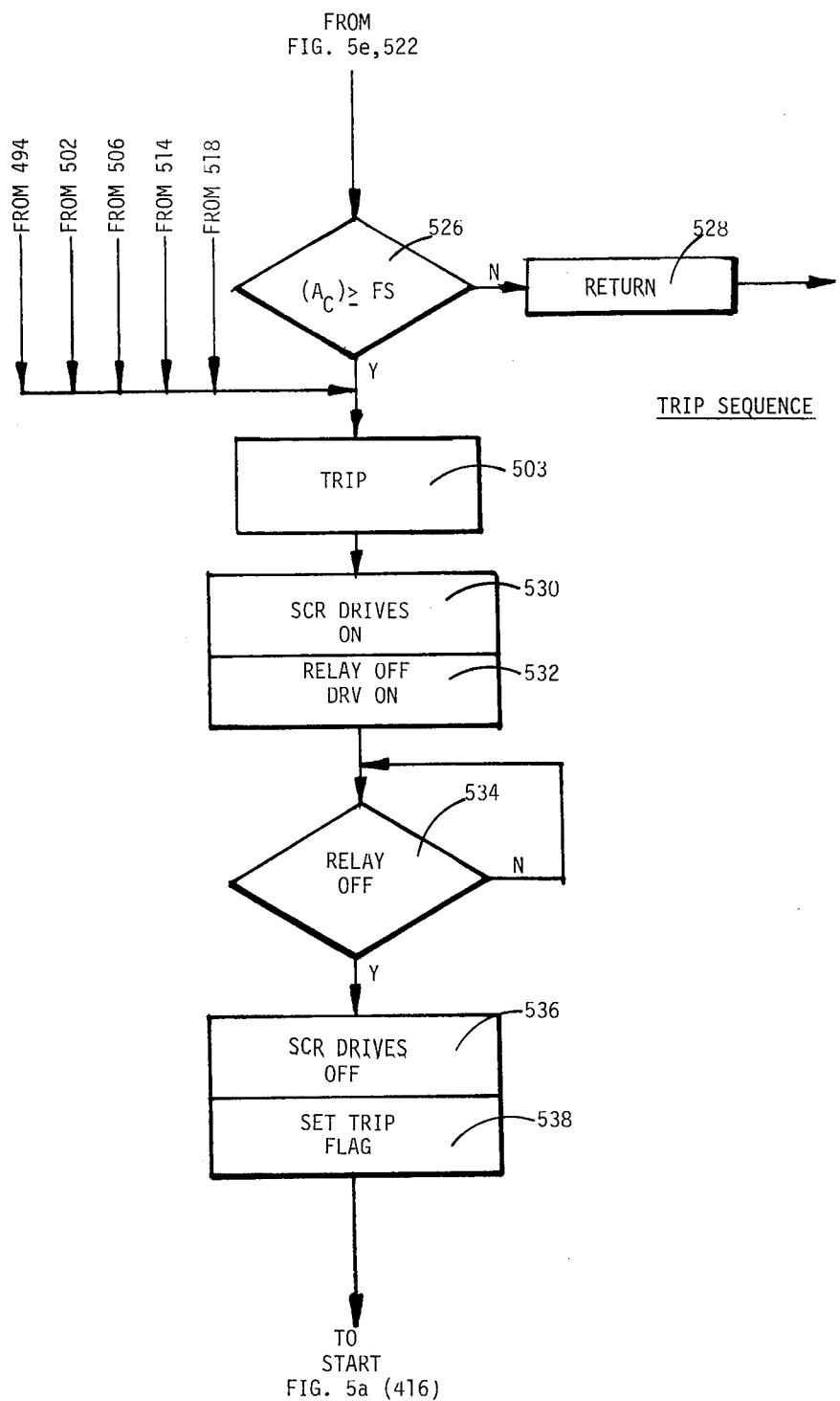

Referring to FIG. 5f if after advancing to the $(A_C)$ greater than FS block 526, the program determines that the value of the $A_C$ accumulator is less than FS, the program advances to the RETURN block 528 from which the program returns to subroutine from which the MEASURE I subroutine was entered. If an overload condition exists on phase C, and the program exits block 526 to TRIP block 503, or if TRIP block 503 is entered from blocks 494, 502, 506, 514, or 518 the program advances to the SCR DRIVES ON block 530 in which all SCRs are commanded on immediately. The program concurrently enters the RELAY OFF DRV ON block 532 in which the program sets an output flag to provide a pulse to relay reset coil 365. The program jumps from block 532 to the RELAY OFF block 534 and repetitively cycles back through block 534 until the CP signal signals opening of load contacts 360, 362 and 364. The program next jumps from block 534 to the SCR DRIVES OFF block 536 in which the program immediately terminates all SCR drive signals without regard to zero crossing signals. The program concurrently enters the SET TRIP FLAG block 538 in which the program sets an output flag line for the systems use signaling that a tripped condition exists.

Figure 6:
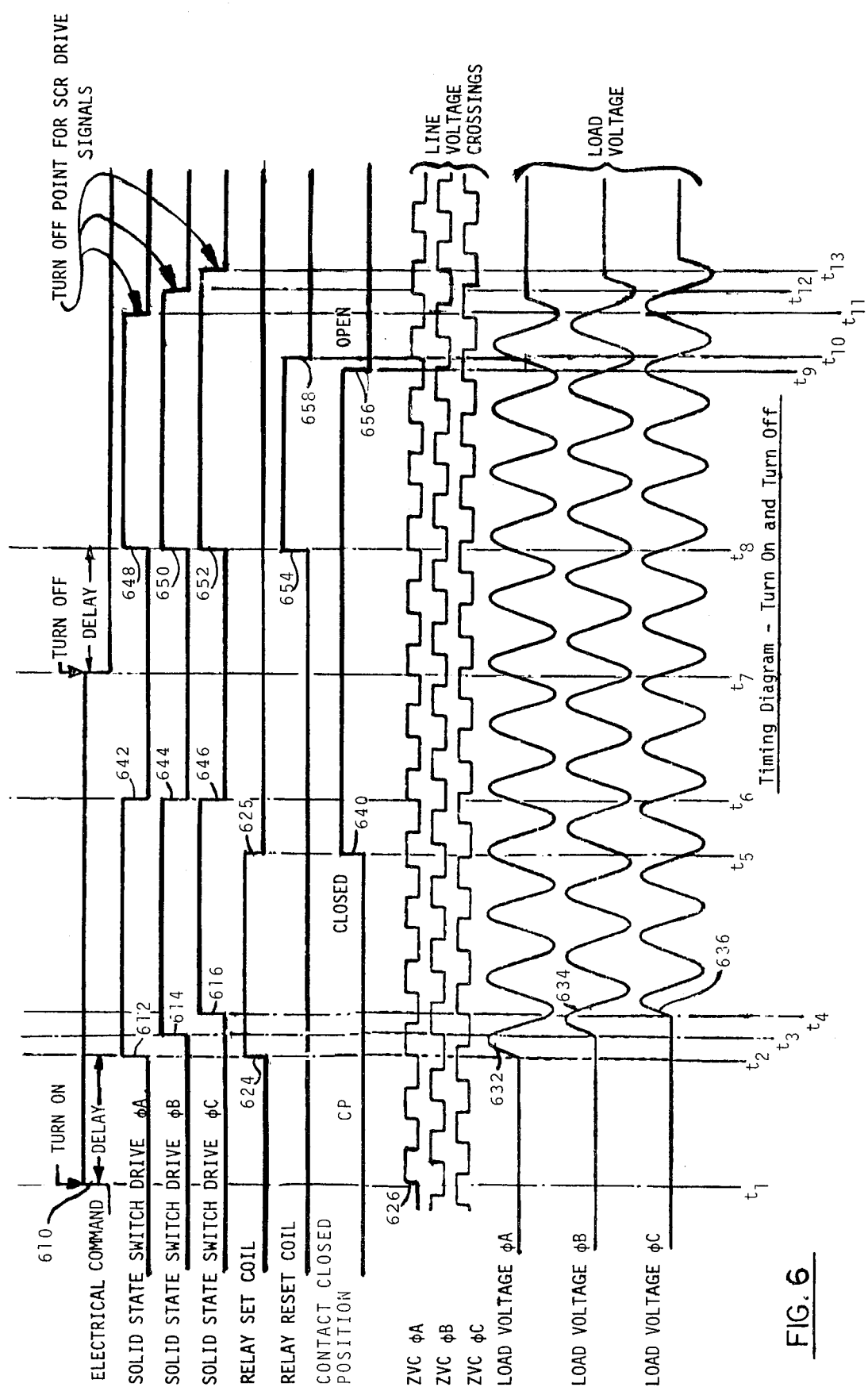
FIG. 6 depicts the signal and voltage waveform relationships for a three phase electrical switch.

Referring now to FIG. 6 there is shown a timing diagram for the three phase ELECTRICAL SWITCH turn on and turn off sequence. Electrical command signal 610 appears at the top of FIG. 6 starting at t1 and ending at t7. The power supply means 341 coupled to a first phase of the multiple phase alternating source voltage 322 is adapted to provide a phase related first zero crossing signal (ZVC) 626 corresponding to the first phase alternating source phase voltage crossing zero voltage having a first predetermined sequence of polarity change. As depicted in FIG. 5c, the program provides a predetermined delay by sequentially passing blocks 456, 458, 460, 462 and back to block 416 until the ZVC register equals zero, at which time the program advances from block 462 to 464. FIG. 6 waveforms 612 614 and 616 depict application of SCR gate drive signals for phase A B and C corresponding to activation of the phase related semiconductor switching means operating signals on lines 336, 337 and 338 of FIG. 4. Waveforms 612, 614 and 616 occur at times t2, t3 and t4 corresponding to the respective source phase voltage crossing zero voltage with a first predetermined sequence of polarity change. SCR gate drive signals 612, 614 and 616 activate the respective semiconductor switching means thereby applying the respective phase related source voltages to the load as depicted in FIG. 6 by load voltage waveforms 632, 634 and 636. The relay set coil waveform 624 shows the pulse applied to the relay set coil 367 commencing as the program advances to block 466 of FIG. 5c and corresponding in time with t2 on FIG. 6. Waveform 624 ends at t5 corresponding with the contact closed position signal CP 640 signaling closure of load contacts 360, 362 and 364. FIG. 5d illustrates the normal program turn on sequence of the phase B and phase C SCR drive signals as the program advances through blocks 468, 472, 474, 478 to the RELAY ON BLOCK 480. The program circulates from block 480 through the MEASURE I block 482 back to block 480 repetitively until the CP signal 640 occurs as depicted in FIG. 6 at time t5. The program then advances from block 480 to the RELAY ON DRIVES OFF, SCR DRIVES OFF block 484 before advancing to the SET ON FLAG block 486. The function of block 484 is to interrupt the pulse to the relay set coil at 625 corresponding in FIG. 6 with the CONTACT CLOSED POSITION WAVEFORM 640 occuring at time t5. Block 484 also interrupts the SCR gate drive signals 642, 644 and 646 at time t6.

The electrical command signal 610 ends at time t7. A turn off delay is provided between time t7 and t8 during which the electrical command signal must remain low for purposes of validation. The normal turn off sequence follows as depicted in FIG. 5b as the program exits block 434 to the SCR DRIVES ON block 438 and then to the RELAY RESET DRV ON block 440 in which, as illustrated in FIG. 6, the SCR gate drive waveforms 648, 650 and 652 are applied along with the relay reset signal 654 to relay reset coil 365 at time t8. The program advances from block 440 to the RELAY SET CP=1 block 442 and continues to circulate to the MEASURE I block 444 and return to block 442 until the contact position signal CP from relay contact 366 signals opening of load contacts 360, 362 and 364.

FIG. 6 depicts interruption of the CP signal 656 at time t9 after which the program advances to the ZVCA block 446 to await a zero crossing signal. As shown in FIG. 5b the program circulates from block 446 to the MEASURE I block 448 returning to block 446 until a zero voltage crossing occurs at time t10 after which the program advances to the RELAY RESET DRV OFF block 447. In block 447 the program terminates the drive to the relay reset coil as depicted by the relay reset coil drive waveform 658.

The program then advances from block 447 to the START ØA TIMER block 450 in which it initializes a phase A timer to provide a three-quarter cycle delay. The program advances to the ØA TIME UP block 452 and recycles through block 452 until the three quarter cycle delay is completed at time t11.

At time t11, the program advances from block 452 to the ØA DR OFF, START ØB TIMER block 454 in which the program terminates the ØA semiconductor operating signal to interrupt the gate drive to the phase A SCRs. The program also initializes a phase B timer to provide a one-third cycle delay and immediately advances to the ØB TIME UP block 417 depicted at the upper right hand corner of FIG. 5a. The program recycles through block 417 until the one-third cycle delay is completed at time t12.

At time t12, the program advances from block 417 to the ØB DR OFF, START ØC TIME block 419 in which the program terminates the phase B semiconductor operating signal to interrupt the gate drive to the phase B SCRs. The program also initializes a phase C timer to provide a one-third cycle time delay and immediately advances to the ØC TIME UP block 421. The program recycles through block 417 until the one-third cycle delay is completed at time t13.

At time t13, the program advances to the ØC DR OFF, CLEAR ON STATE FLAG block 423 in which the program terminates the phase C semiconductor operating signal to interrupt the gate drive to the phase C SCRs. The program next clears the on state flag to provide an external signal to indicate that the electrical switch is open after which the program advances to the START block 416.

Referring to FIG. 6, t11, t12 and t13, comprise the three-quarter cycle points of each respective alternating source phase voltage after the occurrence of a phase A zero crossing signal having a first predetermined sequence of polarity change. Interruption of the respective SCR gate drive signals at these times allows them to remain conductive until load current in each SCR pair changes direction. Interruption of the gate drive signals in this manner provides the added advantage of minimizing the average dc offset voltage applied to the load. This feature is a significant advantage in those applications requiring an electrical switch to modulate power to loads having reactive properties dependent on tape wound and cut cores fabricated from high permeability ferromagnetic materials.

Referring again to FIG. 5a the program calculates the constants required for initializing the one third and three-quarter time delay counters in block 410 each time power is applied to the invention switch thereby enabling the unit to adapt to the fundamental frequency of the alternating source voltage without modification. This operation is performed only once at turn-on in the preferred embodiment due to the computational time required. As microprocessor speeds are increased, this operation will be performed more often thereby making the invention switch more adaptive to changes in the fundamental frequency of the alternating source voltage.

There is thus provided an electrical switch useful in the remote control of electrical power. The invention is particularly suited for use in aircraft and ship board applications requiring resetable overload protection, light weight and high thermal efficiency. The description provided is intended to be illustrative only and is not intended to be limitative. Those skilled in the art may conceive of modifications, but those modifications which fall within the purview of the description are intended to be included therein as well.

What is claimed is:

1. An electrical switch for controlling the application of an alternating source voltage to a load under the control of a command electrical signal, resulting in the development of a load current in response to said command electrical signal comprising:

a semiconductor switching means having a predetermined non-bounce switching characteristic, being responsive to a semiconductor switching means operating signal for connecting said load to said source voltage, an electromechanical switching means having a low voltage drop in a conducting condition being responsive to an electromechanical switching means operating signal and being connected in parallel with said semiconductor switching means for connecting said load to said source voltage, control means having a microcomputer following a predetermined program and being responsive to said command electrical signal for providing said semiconductor switching means operating signal and said electromechanical switching means operating signal, means responsive to said alternating source voltage crossing zero voltage for providing a control X signal to correspond with said alternating source voltage crossing zero voltage having a first predetermined sequence of polarity change, said control means being responsive to said control X signal, said control means being responsive to the concurrence of said command electrical signal and a predetermined control X signal to provide said semiconductor switching means operating signal and said electromechanical switching means operating signal, said semiconductor switching means being responsive to said semiconductor switching means operating signal to provide a first conduction path from said alternating source voltage to said load corresponding with a first predetermined sequence of alternating source voltage polarity change and said electromechanical switching means being responsive to said electromechanical switching means operating signal to provide a second conduction path having a low voltage drop in shunt with said first conduction path and said control means also being responsive to interruption of said command electrical signal to provide said semiconductor switching means operating signal, said semiconductor switching means being responsive to said semiconductor switching means operating signal provides a first conduction path from said alternating source voltage to said load in parallel with said closed load contacts, said control means interrupting said electromechanical switching means operating signal to open said load contacts, said control means being further adapted to interrupt said semiconductor switch means operating signal subsequent to said load contact opening, interruption of said semiconductor switch means operating signal occuring a predetermined time before said source voltage crosses zero voltage having a predetermined sequence of polarity change, said semiconductor switch means being responsive to interruption of said semiconductor switching means operating signal to interrupt said first conduction path in synchronization with said alternating source voltage crossing zero voltage having a first predetermined sequence of polarity change;

whereby, said invention electrical switch provides a bounce-free closure of said conduction path from said alternating source voltage to said load in response to said command electrical signal, said closure corresponding with a first predetermined sequence of alternating source voltage crossing zero voltage having a first predetermined sequence of polarity change; and said invention electrical switch interrupts the conductive path to said load without contact bounce, associated arcing and in a manner, minimizing the DC component of source voltage applied to said load in response to interruption of said command electrical signal, said interruption of said conductive path being synchronized with said alternating source voltage crossing zero having a first predetermined sequence of polarity change.

2. The combination in accordance with claim 1, wherein said electromechanical switch means further includes:

a. load contacts wired to connect said alternating source voltage to said load in response to operation of said electromechanical switch means, and b. position contacts operating to provide a contact closed position signal corresponding to closure of said load contacts;

said control means further including means responsive to said contact closed position signal signaling load contact closure for synchronizing the termination of said semiconductor switching means operating signal with closure of said load contacts, said semiconductor switch means becoming non-conductive in response to termination of said operating signal thereby interrupting said first conduction path subsequent to load contact closure whereby said load contacts provide a low voltage drop and interruption of said first operating signal provides a reduction in the power required to activate said semiconductor switching means.

3. The combination in accordance with claim 1, wherein said electrical switch further comprises:

load current sensing means interposed in series with said load current conduction path for providing a current amplitude signal, said control means being responsive to said current amplitude signal for comparing said current amplitude signal with a first predetermined current amplitude threshold limit, said control means being responsive to said current amplitude signal exceeding said first predetermined current amplitude threshold limit for providing a fast trip signal, said control means being responsive to said fast trip signal to interrupt said operating signals for said semiconductor switching means and said electromechanical switching means, whereby said semiconductor switching means and said electromechanical switching means interrupting said load current path to said load.

4. The combination in accordance with claim 3, wherein said load current sensing means further comprises:

means for converting said current amplitude signal into a digital current amplitude signal, said control means being responsive to said digital current amplitude signal for comparing said digital current amplitude signal with a first predetermined digital current amplitude threshold limit, said control means being responsive to said digital current amplitude signal exceeding said first predetermined digital current amplitude threshold limit for providing said fast trip signal.

5. The combination in accordance with claim 4, wherein said control means microcomputer further includes:

a first accumulator, said predetermined microcomputer program being characterized as commanding said microcomputer to perform the steps of sampling said digital current amplitude signal, squaring each said sampled digital current amplitude signal, adding each said squared digital current amplitude signal to said accumulator, subtracting a first predetermined constant from said accumulator after each addition of said sampled squared digital current amplitude signal, comparing said accumulator value with a second predetermined constant, providing a normal trip signal in response to said accumulator value exceeding said second predetermined constant, said control means being responsive to said normal trip signal to interrupt said operating signals for said semiconductor switching means and said electromechanical switching means, whereby said semiconductor switching means and said electromechanical switching means interrupt said load current conduction path to said load.

6. The combination in accordance with claim 3, wherein said load current sensing means interposed in series with said load current conduction path is characterized as providing a squared current amplitude signal proportional to the square of the load current, said control means being responsive to said squared current amplitude signal, and is further adapted to compare said squared current amplitude signal with a first predetermined current amplitude threshold limit, said control means being responsive to said squared current amplitude signal exceeding said first predetermined current amplitude threshold limit for providing a fast trip signal, said control means being responsive to said fast trip signal to interrupt said operating signals for said semiconductor switching means and said electromechanical switching means, whereby said semiconductor switching means and said electromechanical switching means interrupt said load current path to said load.

7. The combination in accordance with claim 6, wherein said load current sensing means further comprises:

means for converting said squared current amplitude signal into a sampled squared digital current amplitude signal, said control means being responsive to said sampled squared digital current amplitude signal for comparing each said sampled squared digital current amplitude signal with a first predetermined squared digital current amplitude threshold limit, said control means being responsive to said sampled squared digital current amplitude signal exceeding said first predetermined squared digital current amplitude threshold for providing said fast trip signal.

8. The combination in accordance with claim 7, wherein said control means microcomputer further includes:

a first accumulator, said predetermined microcomputer program being characterized as commanding said microcomputer to perform the steps of sampling said squared digital current amplitude signal, adding each said squared digital current amplitude signal to said accumulator, subtracting a first predetermined constant from said accumulator after each said addition of said sampled squared digital current amplitude signal, comparing said accumulator value with a second predetermined constant, providing a normal trip signal in response to said accumulator value exceeding said second predetermined constant, said control means being responsive to said normal trip signal to interrupt said operating signals for said semiconductor switching means and said electromechanical switching means, whereby said semiconductor switching means and said electromechanical switching means interrupt said load current conduction path to said load.

9. The combination in accordance with claim 8, wherein said control means microcomputer repetitively executes said predetermined program, said predetermined proram being characterized to control said microcomputer to control said control means to sequence through steps in response to the concurrence of a command electrical signal and a fast trip signal or the concurrence of a command electrical signal and a normal trip signal;

to first, provide said semiconductor switching means operating signal;

to second, establish a conductive first conduction path from said alternating source voltage to said load, said conducting first conduction path acting to share current with said load contact;

to third, interrupt said operating signal to said electromechanical switching means, to fourth, respond to loss of said contact closed position signal siganlling opening of said load contact by interrupting said semiconductor switching means operating signal, whereby said conducting first conduction path becomes non-conductive, thereby preventing failure.

10. The combination in accordance with claim 9, wherein said semiconductor switching means is further comprised of diodeblocked anti-parallel transistors.

11. The combination in accordance with claim 9, wherein said semiconductor switching means is further comprised of a TRIAC.

12. The combination in accordance with claim 11, wherein said control means being responsive to interruption of said electrical command signal to interrupt said semiconductor switching means operating signal is further adapted to delay said interruption by approximately ¾ cycle measured from said source voltage crossing zero voltage having a first predetermined sequence of polarity change.

13. The combination in accordance with claim 9, wherein said semiconductor switching means is further comprised of antiparallel silicon controlled rectifiers.

14. The combination in accordance with claim 13, wherein said control means being responsive to interruption of said electrical command signal to interrupt said semiconductor switching means operating signal is further adapted to delay said interruption by approximately ¾ cycle measured from said source voltage crossing zero voltage having a first predetermined sequence of polarity change.

15. The combination in accordance with claim 13, wherein said electromechanical switching means further comprises a relay having a position contact, a load contact and a current sharing resistor, said load contact and current sharing resistor being connected in series with said load contacts whereby load current sharing is obtained between said load contacts and said semiconductor switching means.

16. The combination in accordance with claim 15, wherein said relay is a latching relay, said latching relay having a set coil and a reset coil, said control means being further adapted to provide a set pulse to said set coil to transfer said latching relay to close said load contact in response to said electromechanical switching means operating signal and to provide a reset pulse to said reset coil to transfer said relay to open said load contact in response to interruption of said electromechanical switching means operating signal.

17. The combination in accordance with claim 16, wherein said control means microcomputer operates with a fixed precision clock frequency, said predetermined program further comprises steps adapting said computer to receive said electrical command signal, said load contact close position signal and said sampled squared digital current amplitude signal, and to reserve a first memory location for storing a first value indicating that a fast trip signal has occurred, a second memory location for storing a second flag value indicating that a normal trip signal has occurred, a third memory location for storing value indicating that signal X occurred signalling that the alternating source voltage crossing zero voltage with a first predetermined sequence of polarity change has occurred and a fourth memory location for storing a ZVC signal value indicating a predetermined number of zero voltage crossings, said predetermined program being further adapted to provide said fast trip signal, said normal trip signal, said semiconductor switching means operating signal and said electromechanical switching means operating signal, and an initialization sequence of steps to initialize all microcomputer registers and counters in response to application of said alternating voltage source; and, to provide steps for computing the power period by computing the time interval between control X signals; and, to calculate a first time delay interval measured from each respective control X signal, said first time delay interval being equal to a predetermined ratio of said power period, to use said first time delay interval measured from said control X signal when interrupting said semiconductor switching means operating signal;

whereby, said predetermined program adapts said invention switch to correct its timing on each application of power; thereby, enabling said invention switch to operate from said alternating source voltage, said alternating source voltage having a frequency within a predetermined range;

said microcomputer controls closing and interrupting said first and second conduction paths from said alternating source voltage to said load in response to said electrical command signal, said load contact closed position signal and said squared digital current amplitude signal.

18. The combination in accordance with claim 17, wherein said anti-parallel silicon controlled rectifiers are responsive to SCR drive signals, and wherein said control means further includes a control and drive electronic circuit means, said control and drive electronic circuit means being responsive to said semiconductor switching means operating signal for providing said SCR drive signal to said anti-parallel silicon controlled rectifiers, said control and drive electronics circuit means being further adapted to be responsive to said control means electromechanical switching means operating signal to provide an electrical set pulse to said set coil to transfer said latching relay to close said load contacts in response to said electromechanical switching means operating signal and to provide an electrical reset pulse to said reset coil and to transfer said latching relay to open said load contacts in response to interruption of said electromechanical switching means operating signals.

19. The combination in accordance with claim 18, wherein said microcomputer predetermined program is adapted to further comprise:

a measure I subroutine for providing a fast trip signal indication in said fast trip memory location or providing a normal trip signal indication in said normal trip signal memory location, said measure I subroutine commanding the microprocessor to;

read said squared digital current amplitude signal value, and compare said sampled squared digital current amplitude value with a first full scale constant, and if said sampled squared digital current amplitude value exceeds said first full scale constant, to exit to a fast trip subroutine, and if said sampled squared current amplitude signal value is equal to or less than said full scale constant;

to add the sampled squared digital current amplitude value to said first accumulator, to subtract a predetermined K squared constant from said first accumulator and;

if said first accumulator value is less than zero, set said first accumulator value to zero to the compare accumulator value subroutine; if said first accumulator value is not less than zero, advance to the compare accumulator value subroutine;

the compare accumulator value subroutine commands the microprocessor to compare said first accumulator value with a second full scale constant selected for normal trip evaluation; if said first accumulator value exceeds said second full scale constant exit to the normal trip subroutine; if said accumulator value does not exceed said second fully scale constant, return to the entry point of said measure I subroutine;

the trip subroutine commands the microprocessor to turn on the semiconductor operating signal, command the electromechanical operating signal off;

test the load contact position signal and determine if the load contact is open; if the load contact is closed, return and repeat the test of the load contact position signal; if the contact is open;

command the semiconductor operating signal off;

set the trip memory location value to indicate that a trip has occurred and advance to the start subroutine of the microcomputer program;

the start subroutine commands the microprocessor to determine if the tripped flag is set or if the on flag is set indicating that the switch has been commanded on and has advanced through a normal turn-on sequence; if not, then test to determine if the electrical command signal is present; if the electrical command signal is present;

set the ZVC memory location to a binary three value and test to determine if the trip flag has been set and if it has, return to the start subroutine; if not, then advance to the start of the measure I subroutine, the measure I subroutine and return to the start subroutine;

whereby, said invention switch microcomputer program enables said control means to advance to a fast trip or a normal trip routine and to interrupt power to said load.

20. A multiple phase electrical switch for controlling the application of a multiple phase alternating source voltage from a plurality of alternating source voltage phases to a plurality of respective load contacts under the control of an electrical command signal resulting in the development of load current in each source voltage phase in response to said electrical command signal comprising:

a plurality of phase related semiconductor switching means, having a predetermined non-bounce switching characteristic, each respective phase related semiconductor switching means being connected in series with a respective alternating source voltage phase, and each being responsive to a respective phase related semiconductor switch means operating signal to form respective phase related semiconductor conduction paths from each respective alternating source voltage phase to a respective load, a plurality of corresponding electromechanical switching means having a plurality of phase related load contacts, each respective phase related load contact operating in parallel with a respective phase related semiconductor switching means, said electromechanical switching means being responsive to an electromechanical switching means operating signal to close said plurality of phase related load contacts, each respective phase related load contact operating in parallel with a respective phase related semiconductor switching means to form a phase related parallel conduction path for connecting each respective alternating source voltage phase to a respective load control means having a microcomputer following a predetermined program and being responsive to said electrical command signal for providing said respective phase related semiconductor switching means operating signal and said electromechanical switching means operating signal, said microcomputer being adapted to receive said electrical command signal, each respective load contact closed position signal and said control X phase related first zero crossing signal, means responsive to a first alternating source voltage phase crossing zero voltage for providing a control X signal to correspond with said first phase alternating source voltage crossing zero voltage having a first predetermined sequence of polarity change, said control means being responsive to said control X signal, said control means being responsive to the concurrence of said command electrical signal and a predetermined control X signal to sequentially provide a semiconductor switching means operating signal for each respective semiconductor switching means, and said electromechanical switching means operating signal for each respective electromechanical switching means, each respective switching means being responsive to its respective semicondcutor switching means operating signal to provide a first conduction path from each respective alternating source voltage phase to said load corresponding with a first predetermined sequence of alternating source voltage polarity change for each respective source voltage phase and each respective electromechanical switching means being responsive to its respective electromechanical switching means operating signal to provide a respective second conduction path having a low voltage drop in shunt with its respective first conduction path subsequent to closure of its respective semiconductor switching means and, said control means also being responsive to interruption of said command electrical signal to first provide said semiconductor switching means operating signal, each respective semiconductor switching means being responsive to its respective semiconductor switching means operating signal to provide a first conduction path from its respective alternating source voltage phase to its respective load in parallel with each respective closed load contacts, said control means interrupting said electromechanical switching means operating signal to open each respective load contacts, said control means being further adapted to interrupt each respective semiconductor switch means operating signal subsequent to each respective load contact opening, interruption of each respective semicondcutor switch means operating signal occurring a predetermined time before each respective source voltage phase crosses zero voltage having a predetermined sequence of polarity change, each respective switch means being responsive to interruption of each respective semiconductor switching means operating signal to interrupt said first conduction path in synchronization with each respective alternating source voltage phase crossing zero voltage having a first predetermined sequence of polarity change;

whereby said invention electrical switch provides a bounce-free closure of each respective conduction path from said alternating source voltage to said load in response to said command electrical signal, said closure corresponding with a first predetermined sequence each respective alternating source votlage phase crossing zero voltage having a predetermined sequence of polarity change; and said invention electrical switch interrupts the conductive path to said load without contact bounce, associated arcing and in a manner, minimizing the DC component of source voltage applied to said load in response to interruption of said command electrical signal, said interruption of said conductive path being synchronized with said alternating source voltage crossing zero having a first predetermined sequence of polarity change.

21. The combination in accordance with claim 20, wherein said microcomputer predetermined program is adapted to provide a validation of said command electrical signal when received by performing a sequence of steps comprising:

a test command signal subroutine for testing to determine if said command electrical signal is on; if said command signal is not on, setting a ZVC counter to a value of binary three, and advancing to the start subroutine, the program starting point, if said command signal is on, determining if the control X signal is true, if the control X signal is not true, advancing to the start of the command signal subroutine the program start subroutine and returning to, if the control X signal is true;

subtract 1 from ZVC counter and test to determine if ZVC counter is equal to zero, if no then return to the program start subroutine, if yes then test for a control X signal until control X is present, turn on the first phase semiconductor operating signal and initialize the timer for a second phase crossing with a first sequence of polarity change.

22. The combination in accordance with claim 20, further comprises:

each respective electromechanical switching means further including a load contact position signal contact, said load contact position signal contact closing in synchronization with said plurality of phase related load contacts and providing a load contact position signal, said control means microcomputer being characterized by said predetermining program to be responsive to said electrical command signal and in response to said control X signal, being further adapted to synchronize each respective phase related semiconductor switching means operating signal to each respective phase related semiconductor switching means in synchronized source phase voltage crossing zero voltage with a first predetermined sequence of polarity change relation, said control means microcomputer being further characterized to concurrently provide each respective electromechanical switching means operating signal, said control means being further adapted to be responsive to interruption of said electrical command signal to synchronize activation of each respective phase related semiconductor switching means operating signal after a predetermined delay with interruption of each respective electromechanical switching means operating signal and to synchronize interruption of each respective phase related semiconductor switching means operating signal with said control X signal signalling said first phase alternating source phase voltage crossing zero voltage with a first predetermined sequence of polarity change and with loss of said load contact position signal interrupting each respective phase related semiconductor conduction path subsequent to opening of said load contacts, whereby, in response to said electrical command signal said plurality of phase related semiconductor switching means provide a bounce free closure of said phase related conduction paths in synchronization with a first phase alternating source phase voltage crossing zero voltage with a first predetermined sequence of polarity change, and whereby in response to removal of said electrical command signal said plurality of phase related semiconductor switching means provide a noise free interruption of said phase related conduction paths subsequent to opening of said load contacts signaled by interruption of said load contact position signal, and in synchronization with said first phase alternating source phase voltage crossing zero voltage with a first predetermined sequence of polarity change.

23. The combination in accordance with claim 22, wherein said semiconductor switching means is further of diode blocked anti-parallel transistors.

24. The combination in accordance with claim 22, wherein said semiconductor switching means is further comprised of TRIACs.

25. The combination in accordance with claim 22, wherein said semiconductor switching means is further comprised of anti-parallel silicon controlled rectifiers.

26. The combination in accordance with claim 25, wherein said multiple phase alternating source voltage is further adapted to have a first, a second and a third alternating source phase voltage, and wherein said control means is further adapted to be responsive to interruption of said electrical command signal followed by opening of said contact closed position signal for delaying the interruption of said first phase operating signal by an interval of approximately $\frac{3}{4}$ cycle measured from said first alternating source phase voltage crossing zero voltage having a predetermined sequence of polarity change, and for delaying the interruption of said second and third phase operating signals by additional sequential one-third cycle time delays measured from termination of said $\frac{3}{4}$ cycle time delay.

27. The combination in accordance with claim 22, wherein said control means microcomputer is characterized by said predetermined program to respond to said electrical command signal to synchronize termination of each respective phase related semiconductor switching means operating signal with closure of each respective load contact position signal contact, whereby said respective phase related semiconductor switching means interrupt said respective phase related semiconductor conduction paths from each respective alternating source voltage phase to said load subsequent to closure of said load contacts, thereby conserving power required to activate said phase related semiconductor switching means.

28. The combination in accordance with claim 27, further comprising:

a plurality of phase related current sharing resistors, each respective phase related current sharing resistor being connected in series with a respective phase related load contact, said respective series connected phase related load current sharing resistor and phase related load contact operating in parallel with a respective phase related semiconductor switching means forming phase related parallel conduction paths for connecting each respective alternating source voltage phase to said load whereby each respective phase related current sharing resistor operates to provide load current sharing between said respective phase related load contact and said respective phase related semiconductor switching means.

29. The combination in accordance with claim 28, wherein said multiple phase electrical switch further comprises:

a plurality of phase related load current sensing means, each respective phase related load current sensing means being interposed in series with a respective multiple phase alternating source voltage phase load current conduction path for providing respective digital phase related current amplitude signals, said control means microcomputer being characterized by said predetermined program to be responsive to each respective digital related current amplitude signal for comparing said digital current amplitude values with a first predetermined current amplitude threshold limit, said control means microcomputer being characterized by said predetermined program to be responsive to each respective phase related digital current amplitude signals exceeding said first predetermined current amplitude threshold limit for providing a fast trip signal, said control means microcomputer being responsive to said fast trip signal to interrupt said phase related semiconductor switching means operating signals and said electromechanical switching means operating signals, whereby said phase related semiconductor switching means and said electromechanical switching means phase related load contacts interrupt said load current path to said load.

30. The combination in accordance with claim 29, wherein said control means microcomputer is characterized by said predetermined program as including a memory location reserved to function as a digital accumulator, means for sampling each respective phase related digital current amplitude signal, squaring each sampled phase related digital current amplitude signal, adding each respective squared phase related digital current amplitude signal to said accumulator, subtracting a predetermined constant from said accumulator after each addition of said sampled squared phase related digital current amplitude signal, comparing each accumulator value with a second predetermined constant threshold limit, providing a normal trip signal in response to said accumulator value exceeding said second predetermined constant threshold limit, said control means microcomputer being characterized by said predetermined program to respond to normal trip signal to interrupt said phase related semiconductor switching means operating signals and said electromechanical switching means operating signal, whereby each respective phase related semiconductor switching means and each electromechanical switching means load contacts interrupt each respective phase related load current conduction path to each respective load.

31. The combination in accordance with claim 30, wherein said microcomputer predetermined program characterizes said microcomputer as having a plurality of phase related digital accumulators, the control means microcomputer being characterized by said predetermined program to sample each respective phase related digital current amplitude signals, squaring each respective sampled phase related digital current amplitude signal, adding each respective squared phase related digital current amplitude signal to a respective phase related accumulator, subtracting a predetermined constant from each respective phase related accumulator after each said addition of said sampled squared phase related digital current amplitude signal, comparing each said respective phase related accumulator value with a second predetermined constant threshold limit, providing a normal trip signal in response to any digital accumulator value exceeding said second predetermined constant threshold limit, whereby said respective phase related semiconductor switching means and said electromechanical switching means load contacts interrupt said respective phase related load current conduction paths to said load.

32. The combination in accordance with claim 31, wherein said phase related load current sensing means further comprises:

means for converting said squared phase related load current amplitude signals into squared phase related digital current amplitude signals, said control means microcomputer being characterized by said predetermined program to be responsive to said squared phase related digital current amplitude signals for comparing said squared phase related digital current amplitude signals with a first squared predetermined digital current amplitude threshold limit, said control means being responsive to any squared phase related digital current amplitude signal exceeding said first predetermined squared digital current amplitude threshold limit for providing said fast trip signal.

33. The combination in accordance with claim 32, wherein said control means microcomputer is further characterized by said predetermined program to further include, a squared accumulator and to perform the steps of sampling said squared phase related digital current amplitude signals, adding each respective squared phase related digital current amplitude signal to said squared accumulator, subtracting a predetermined constant from each squared accumulator after each said addition of said sampled squared phase related digital current amplitude signal, comparing each squared accumulator value with a second predetermined constant threshold limit, providing a normal trip signal in response to said squared accumulator value exceeding said second predetermined constant threshold limit, said control means being responsive to said normal trip signal to interrupt said phase related semiconductor switching means operating signals and said electromechanical switching means operating signal, whereby said respective phase related semiconductor switching means and said electromechanical switching means phase related load contacts interrupt said phase related load current conduction paths to said load.

34. The combination in accordance with claim 33, wherein said control means microcomputer is further characterized by said predetermined program to further comprise:

a plurality of squared phase related accumulators, and the steps of sampling said squared phase related digital current amplitude signals, adding each respective squared phase related digital current amplitude signal to said respective squared phase related accumulator, subtracting a predetermined constant from each respective squared phase related accumulator after each said addition of said sampled squared phase related digital current amplitude signal, comparing each said respective squared phase related accumulator value with a second predetermined constant threshold limit, providing a normal trip signal in response to said accumulator value exceeding said second predetermined constant threshold limit, said control means being responsive to said normal trip signal to interrupt said phase related semiconductor switching means operating signals and said electromechanical switching means operating signal whereby said respective phase related semiconductor switching means and said electromechanical switching means phase related load contacts interrupt said phase related load current conduction paths to said load.

35. The combination in accordance with claim 34, wherein said predetermined program provides a plurality of phase related interrupt timing signals referenced to said first zero crossing signal, said predetermined program being responsive to interruption of said electrical command signal, interruption of said contact position signal, and said respective phase related interrupt timing signal to synchronize interruption of said semiconductor switching means operating signal in sequential, respective, source voltage crossing zero voltage having a first predetermined sequence of polarity change relation.

36. The combination in accordance with claim 35, wherein each said semiconductor switching means is a respective antiparallel silicon controlled rectifier and wherein in response to interruption of said operating signal, each respective semiconductor switching means operating signal is first commanded on and wherein subsequent to opening of said each respective contact position contact said respective phase related interrupt timing signals are synchronized to occur approximately $\frac{1}{4}$ cycle after each respective source voltage phase crosses zero voltage having a first predetermined sequence of polarity change.

* * * * *